United States Patent [19]

Inagaki et al.

[11] Patent Number: 4,968,593
[45] Date of Patent: Nov. 6, 1990

[54] OPTICAL INFORMATION RECORDING MEDIUM

[75] Inventors: Yoshio Inagaki; Keiichi Adachi; Yoshihiro Jimbo, all of Minami-Ashigara; Masao Yabe, Fujinomiya, all of Japan

[73] Assignee: Fuji Photo Film Co., Ltd., Kanagawa, Japan

[21] Appl. No.: 161,474

[22] Filed: Feb. 26, 1988

[30] Foreign Application Priority Data

Feb. 27, 1987 [JP] Japan .................................. 62-44870
May 30, 1987 [JP] Japan .................................. 62-135750
Jul. 20, 1987 [JP] Japan .................................. 62-180320

[51] Int. Cl.$^5$ .......................... G11B 7/24; G03C 1/73; G03C 1/735
[52] U.S. Cl. .................................... 430/495; 430/270; 430/945; 346/135.1; 428/64
[58] Field of Search .................. 430/945, 270; 428/64, 428/65, 204, 913; 369/288; 346/135, 135.1

[56] References Cited

U.S. PATENT DOCUMENTS

| | | | |
|---|---|---|---|
| 4,446,223 | 5/1984 | Wadsworth et al. | 430/338 |
| 4,499,165 | 2/1985 | Molaire | 430/17 |
| 4,551,413 | 11/1985 | Bell | 430/270 |
| 4,656,121 | 4/1987 | Sato et al. | 430/495 |
| 4,730,902 | 3/1988 | Suzuki et al. | |
| 4,761,181 | 8/1988 | Suzuki | |
| 4,763,966 | 8/1988 | Suzuki et al. | |
| 4,767,571 | 8/1988 | Suzuki et al. | |
| 4,791,023 | 12/1988 | Suzuki et al. | |
| 4,851,322 | 7/1989 | Inagaki et al. | |

FOREIGN PATENT DOCUMENTS 71295 4/1985 Japan .
14988 1/1986 Japan .

Primary Examiner—Paul R. Michl
Assistant Examiner—Mark R. Buscher
Attorney, Agent, or Firm—Birch, Stewart, Kolasch & Birch

[57] ABSTRACT

The present invention is directed to an optical information recording medium for carrying out recording, readout and erasing with laser beams which comprises a support having carried thereon at least one of the compounds represented by the following general formulae (I), (II), (III) and (IV):

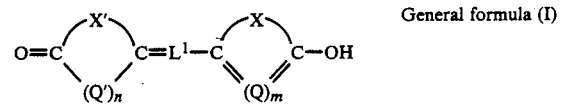

General formula (I)

wherein X and X' each represents an atomic group necessary for forming a carbon ring or an atomic group necessary for forming a specific heterocyclic ring; $L^1$ mainly represents a methine group, or a group formed by linking 3 or 5 methine groups in turn to form conjugated double bonds; and Q and Q' each represents an atomic group whereby a conjugated double bond chain is completed;

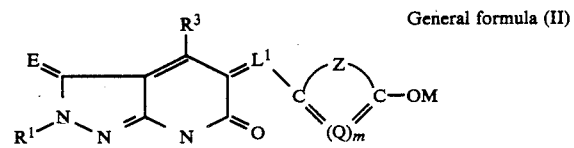

General formula (II)

wherein $L^1$ and Q are as defined in general formula (I); Z represents an atomic group necessary for forming a carbon ring or heterocyclic ring; $R^1$ to $R^3$ and E represent various substituents; and M represents an ion, etc.;

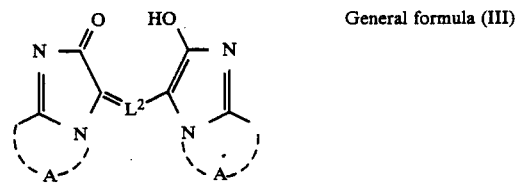

General formula (III)

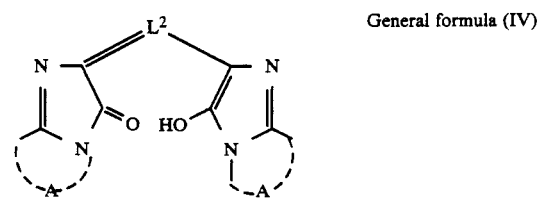

General formula (IV)

in the above general formulae (III) and (IV), A represents an atomic group necessary for forming a pyridine, pyrimidine, pyrazine or triazine ring; and $L^2$ represents a methine group, or a group formed by linking 3 or 5 methine groups in turn to form conjugated double bonds.

Optical information recording media of the invention each have a high C/N and thus adequate recording characteristics, and have a high stability with respect to long-term preservation or long-time reading.

These effects may further be enhanced by using a singlet oxygen quencher.

20 Claims, No Drawings

OPTICAL INFORMATION RECORDING MEDIUM

BACKGROUND OF THE INVENTION

1. Field of the Invention

The present invention relates to optical information recording media of the heat mode type which each have a thin film of an organic dye and wherein recording and readout are conducted by causing a change of state with high density energy beams

2. Description of the Prior Art

Heretofore, information recording media wherein recording and readout of information are each carried out by irradiating a rotating disc-shaped information recording medium with a laser beam have been known. As recording layers in these information media, those wherein metals having low melting points, or metals having low melting points and dielectric substances are used have been proposed. However, these recording layers have disadvantages such as poor preservability, low resolution, low recording density and high manufacturing cost. Recently, it has been proposed and practiced that a thin film of an organic dye whose physical properties may be changed with light of relatively long wavelength is used in the recording layer. However, dyes which have absorption bands in long wavelength generally have problems, for example, a problem that they have only low stability against heat and light. Thus, it is the present state of the art that recording layers having recording characteristics which are stable over a long time period and are satisfactory have not yet been developed.

On the other hand, an optical information recording medium which contains an oxonol dye, particularly an oxonol dye having a dioxopyrazolopyridine ring has been disclosed in Japanese Patent Unexamined Published Application (hereinafter referred to as "J.P. KOKAI") No. 60-71295. However, dyes used in these information media are difficult to be synthesize, and have a great practical disadvantage that it is generally difficult to obtain them in a high purity and in a high yield. Further, only one compound among those disclosed in J.P. KOKAI No. 60-71295 is conjectured to be capable of having absorption maximum in the wavelength range of a semiconductor laser (no specific absorption maximum wavelength and example are disclosed therein about the compound). As is understood from the foregoing, it has been difficult to synthesize a dye having an absorption maximum wavelength in the wavelength range of a semiconductor laser, namely in the near infrared region, and it has been extremely difficult to synthesize and isolate such a dye in an amount necessary for evaluating its performance as an optical information recording medium.

SUMMARY OF THE INVENTION

A first object of the present invention is to provide an optical information recording medium which has a high C/N ratio.

A second object of the invention is to provide an optical information recording medium having a dye recording layer which is capable of maintaining adequate recording characteristics over a long time period and is thus excellent in stability.

A third object of the invention is to provide an optical information recording medium which comprises a support having carried thereon a novel oxonol dye which is easily synthesized.

The above objects of the invention have been accomplished by an optical information recording medium for carrying out recording, readout and erasing with laser beams which comprises a support having carried thereon at least one of the compounds represented by the following general formulae (I), (II), (III) and (IV);

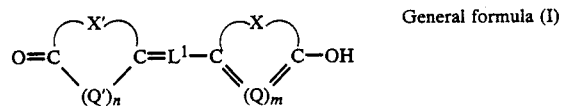

General formula (I)

wherein $L^1$ represents a methine group which may be substituted, or an atomic group whereby a polymethine chain is completed where 3, 5 or 7 methine groups are linked in turn to form conjugated double bonds and which chain may be substituted; Q and Q' are the same or different, and each represents an atomic group whereby a conjugated double bond chain is completed; m and n independently represent 0 or 1; and X and X' are the same or different, and each represents an atomic group necessary for forming a carbon ring, or an atomic group necessary for forming a heterocyclic ring selected from the following atomic groups (the carbon ring may form a condensed ring together with another ring, and the carbon ring or heteerocyclic ring may have substituent(s)):

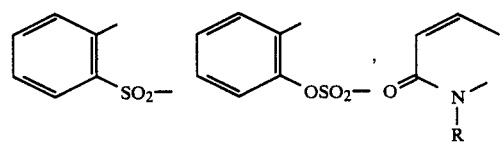

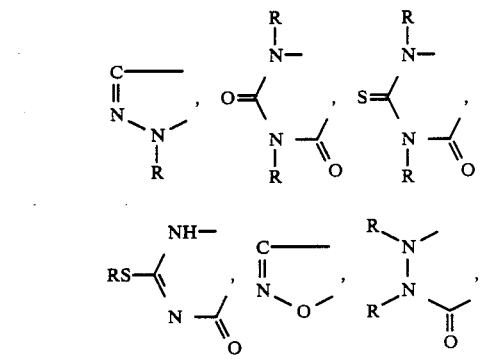

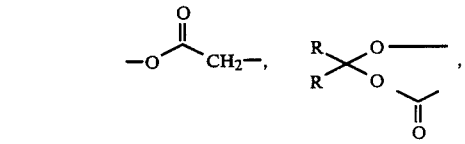

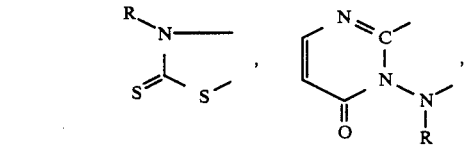

-continued

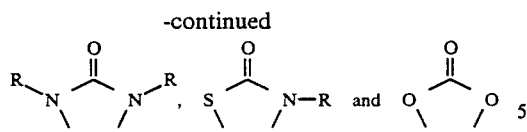

(wherein R represents a hydrogen atom or a substituent).

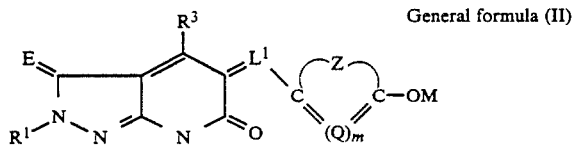

General formula (II)

wherein Q, L$^1$ and m are as defined in the general formula (I); Z represents an atomic group necessary for forming a carbon ring or a heterocyclic ring (the carbon ring or heterocyclic ring may form a condensed ring together with another ring, or may have substituent(s)); M represents a hydrogen atom, a metal atom, a metal complex, an ammonium ion which may be substituted, or a quaternary phosphonium ion; E represents O, S or NR$^4$; R$^1$ and R$^4$ may be the same or different and each represents an optionally substituted alkyl group, an optionally substituted alkenyl group, an optionally substituted alkynyl group, an optionally substituted aryl group, an optionally substituted heterocyclic group, an optionally substituted amino group, an optionally substituted hydrazino group or an optionally substituted diazenyl group; R$^2$ represents an optionally substituted alkyl group, an optionally substituted aryl group, an optionally substituted alkenyl group, an optionally substituted alkynyl group or an optionally substituted heterocyclic group; R$^3$ represents a hydrogen atom, a halogen atom, a cyano group, a nitro group, a hydroxyl group, a carboxyl group, an optionally substituted alkyl group, an optionally substituted aryl group, an optionally substituted alkenyl group, an optionally substituted alkoxy group, an optionally substituted aryloxy group, an optionally substituted heterocyclic group, an optionally substituted alkoxycarbonyl group, an optionally substituted aryloxycarbonyl group, an optionally substituted amino group, an optionally substituted akyloxy group, an optionally substituted carbamoyl group, an optionally substituted sulfamoyl group, an optionally substituted alkylthio group, an optionally substituted acylthio group, an optionally substituted alkylsulfonyl group, an optionally substituted acylsulfonyl group or an optionally substituted alkynyl group; and R$^1$ and R$^4$ may also combine to form a ring;

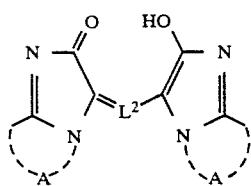

General formula (III)

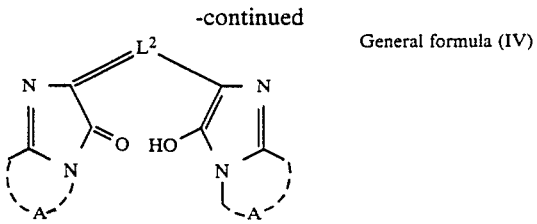

General formula (IV)

in the above general formulae (III) and (IV), A represents an atomic group necessary for forming a pyridine, pyrimidine, pyrazine or triazine ring (these rings may each form a condensed ring together with a benzene ring, and these rings may each be substituted with substituent(s) each having 30 or less carbon atoms); and L$^2$ represents an optionally substituted methine group, or a group formed by linking optionally substituted 3 or 5 methine groups in turn to form conjugated double bonds.

Next, definitions of various the groups in general formula (I) are explained in more detail below. The ring which is completed containing X and Q, or X' and Q' is preferably a 4-, 5-, 6- or 7-membered ring which may further form a condensed ring with another 4-, 5-, 6- or 7-membered ring, or may have substituent(s).

Among the atomic groups represented by X or X', atomic groups each forming a carbon ring are, for example, as follows;

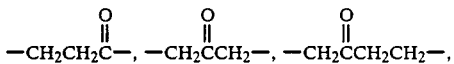

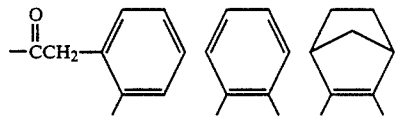

As the "substituent" in the definition of R and R', an optionally substituted alkyl group, an optionally substituted aralkyl group such as a benzyl group o an optionally substituted aryl group may be mentioned.

Particularly preferred atomic groups among those represented by, X or X' are those whereby 5- or 6- membered heterocyclic rings may be completed.

Particularly preferred linking groups among those represented by L$^1$ are those represented by the following general formulae (a) to (h):

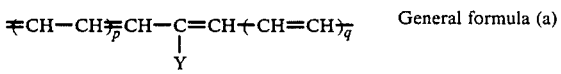

General formula (a)

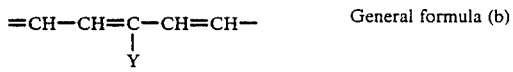

General formula (b)

General formula (c)

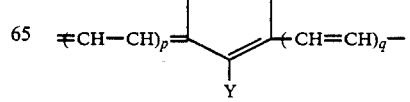

-continued

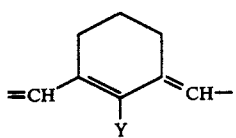
General formula (d)

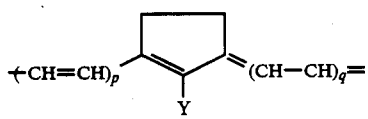
General formula (e)

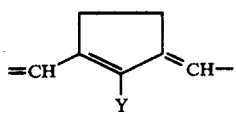
General formula (f)

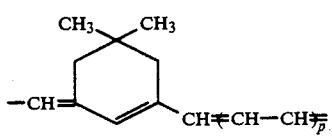
General formula (g)

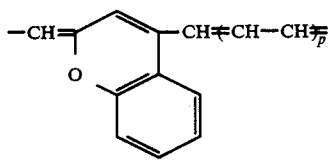
General formula (h)

In general formulae (a) to (h), Y represents a hydrogen atom or a monovalent group, and p and q independently represent 0 or 1. Preferred examples of the monovalent group include an optionally substituted lower alkyl group such as a methyl or trifluoromethyl group, an optionally substituted aralkyl group such that as a benzyl or p-methoxybenzyl group, an optionally substituted aryl group such as a phenyl, m-chlorophenyl or naphthyl group, a lower alkoxy group such as a methoxy group, a cycloalkyloxy group such as cyclohexyloxy group, a disubstituted amino group such as a dimethylamino, diphenylamino, methylphenylamino, morpholino, imidazolidino or ethoxycarbonylpiperadino group, an alkylcarbonyloxy group such as an acetoxy group, an alkylthio group such as a methylthio or dodecylthio group, an arylthio group such as a phenylthio group, a cyano group, a nitro group, a halogen atom such as F, Cl or Br and the like.

Particularly preferred linking groups among those represented by L¹ are those represented by the general formulae (a) and (b), and above all, those of the general formulae (a) and (b) is preferred wherein Y is a hydrogen atom and at least one of p and q is 0.

Preferred examples of substituent(s) on L¹, X or X' in the general formula (I) are those which each have carbon atoms of 30 or less, and are selected from the following groups which each may further have substituent(s): alkyl group(s), aralkyl group(s), aryl group(s), hydroxy group(s), F, Cl, Br, I, cyano group(s), nitro group(s), alkoxy group(s), aralkyloxy group(s), aryloxy group(s), acyl group(s), acyloxy group(s), acylamino group(s), sulfonamido group(s), aryloxycarbonyl group(s), aralkyloxycarbonyl group(s), alkoxycarbonyl group(s), carbamoyl group(s), sulfamoyl group(s), carboxyl group(s) or carboxylato group(s), sulfonic acid group(s) or sulfonato group(s), carbamoylamino group(s), sulfamoylamino group(s), alkylsulfonyl group(s), aralkylsulfonyl group(s), arylsulfonyl group(s), alkylsulfinyl group(s), aralkylsulfinyl group(s), arylsulfinyl group(s), alkylthio group(s), aralkylthio group(s) or arylthio group(s).

Next, each group in general formula (II) is explained in more detail below. Examples, preferred examples and the like of L¹ and m are the same as described above for general formula (I).

The ring which is completed containing Z and Q is preferably a 4-, 5-, 6- or 7-membered ring which may further form a condensed ring with another 4-, 5-, 6- or 7-membered ring, or may have substituent(s).

Hetero atoms used for forming heterocyclic rings completed containing Z and Q and preferably B, N, O, S, Se and Te.

Among the atomic groups represented by Z, atomic groups each forming a carbon ring are, for example, as follows;

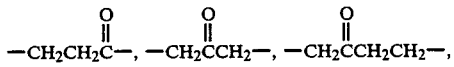

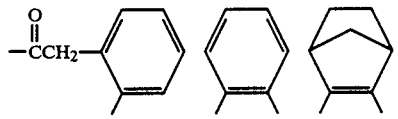

Among atomic groups represented by Z, atomic groups each forming a heterocyclic ring are, for example, as follows:

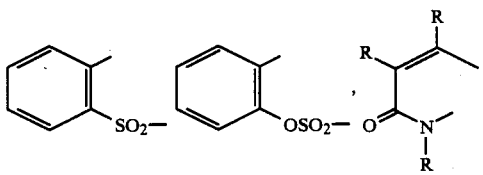

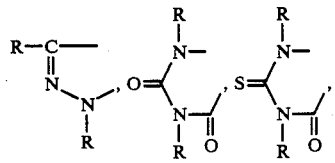

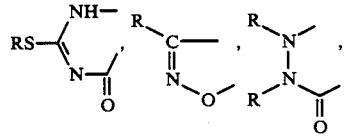

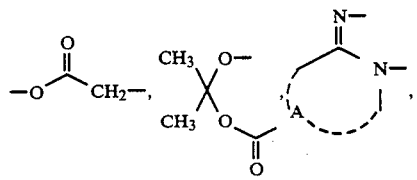

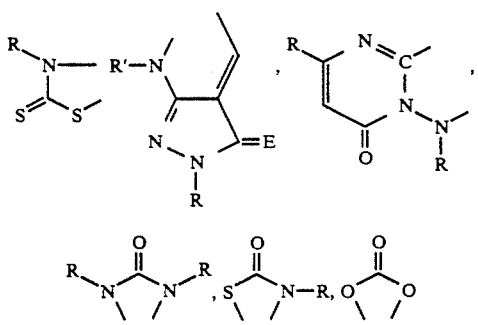

wherein R and R' have the same meaning as R referred to with respect to definition of X in the general formula (I), provided that R' does not represent a hydrogen atom; A has the same meaning as defined in general formulas (III) and (IV), and E has the same meaning as defined in general formula (II).

Particularly preferred atomic groups among those represented by, Z are those whereby 5- or 6-membered heterocyclic rings may be completed, and which each contain at least one hetero atom selected from B, N, O, S, Se and Te.

Preferred groups among those represented by M are a hydrogen atom, an alkali metal ion, an alkyline earth metal ion, a nickel ion, a copper ion, an iron ion, a cobalt ion, a chromium ion, a cation complex containing Ni, Cu, Fe, Co or Cr, an ammonium ion optionally substituted with alkyl, aryl or aralkyl group(s) each having 30 or less carbon atoms, or a quaternary phosphonium ion substituted with alkyl, aryl or aralkyl group(s) each having 40 or less carbon atoms, and particularly a hydrogen atom.

Preferred groups among those represented by E are O and N—$R^4$, and preferred groups as $R^4$ are an optionally substituted alkyl group, an optionally substituted hydrazino group and an optionally substituted diazenyl group. When E is N—$R^4$, it is preferable for $R^4$ and $R^1$ to combine to form a ring. Preferred examples of a ring formed by combination of $R^1$ and $R^2$ include imidazole, pyrazole, triazole and tetrazole rings, and these rings may each have substituent(s) and/or for a condensed ring with another ring.

Preferred examples of $R^1$ or $R^4$ include an optionally substituted alkyl group having 1 to 30 carbon atoms, an optionally substituted phenyl group having 6 to 30 carbon atoms, an optionally substituted 5- or 6-membered heterocyclic group having 1 to 30 carbon atoms (B, N, O, S, Se, Te and/or the like are (is) contained as hetero atom(s)). Substituent(s) optionally substituted on each of these groups may be neutral or ionic, and preferred examples of the substituent(s) include halogen atom(s) (for example, F, Cl, Br or I), cyano group(s), nitro group(s), carboxyl group(s), sulfonic acid group(s), hydroxyl group(s), alkoxy group(s) (for example, methoxy, isopropoxy or hexadecyloxy group(s)), optionally substituted aryloxy group(s) (for example, phenoxy, 2,4-di-t-pentylphenoxy, m-pentadecylphenoxy, p-methoxyphenyl, 3,5-dichlorophenyl, 3-sulfophenyl or 3,5-disulfophenyl group(s)), optionally substituted alkyl group(s) (for example, methyl, 4-sulfobutyl, 2-methoxyethyl or trifluoromethyl), optionally substituted aryl group(s) (for example, phenyl, 4-sulfophenyl, 3-chlorophenyl, 4-hexylphenyl or 2-naphthyl group(s)), optionally substituted amino group(s) (for example, amino, methylamino, phenylamino, acetylamino, methanesulfonylamino, methylcarbamoylamino, trimethylammonio, phenylthiocarbamoylamino or benzenesulfonylamino group(s)), optionally substituted carbamoyl group(s) (for example, carbamoyl, methylcarbamoyl, phenylcarbamoyl, octadecylcarbamoyl, diethylcarbamoyl or pyrrolidinocarbonyl group(s)), optionally substituted sulfamoyl group(s) (for example, sulfamoyl, dimethylsulfamoyl, t-butylsulfamoyl, phenylsulfamoyl, pyrrolidinosulfonyl, 3-(2,4-di-t-pentylphenoxy)butylsulfamoyl group(s)), alkyl-, aralkyl- or arylthio group(s) (for example, methylthio, phenylthio, benzylthio or octadecylthio group(s)), optionally substituted alkylsulfonyl group(s) (for example, methanesulfonyl or) 2-ethoxyethylsulfonyl group(s)), and optionally substituted arylsulfonyl group(s) (for example, benzenesulfonyl, dodecylbenzenesulfonyl or 2-(2-methoxyethoxy)-5-(4-hydroxyphenylazo)benzenesulfonyl group(s)).

Particularly preferred examples of $R^1$ or $R^4$ are an optionally substituted alkyl group having 1 to 20 carbon atoms (the substituent(s) include those enumerated above as preferred ones), an optionally substituted phenyl group having 6 to 20 carbon atoms (the substituent(s) include those enumerated above as preferred ones), and a 5- or 6-membered heterocyclic ring having 1 to 20 carbon atoms (for example, a 2-pyridyl, 4-pyridyl, 2-benzothiazolyl, 2-(1-methylimidazolyl) or 4,6-diethylamino-2-triazinyl group).

Preferred examples of $R^2$ are an optionally substituted alkyl group having 1 to 30 carbon atoms, an optionally substituted phenyl group having 6 to 30 carbon atoms, and an optionally substituted heterocyclic group having 1 to 30 carbon atoms (5- or 6-membered ring; hetero atom(s) are selected from B, N, O, S, Se and Te). Preferred examples of the substituent(s) include those enumerated above as preferred substituents on $R^1$.

Particularly preferred examples of $R^2$ include an optionally substituted alkyl group having 1 to 20 carbon atoms (for example, a methyl, 4-sulfobutyl, 2-methoxyethyl, trifluoromethyl or benzoyloxymethyl group), an optionally substituted phenyl group having 6 to 20 carbon atoms (for example, a phenyl, 4-sulfophenyl, 3-chlorophenyl, 3-trifluoromethylphenyl, 2-methanesulfonyl-4-nitrophenyl, 2-nitro-4-dimethylsulfamoylphenyl or 4-methanesulfonylphenyl group) and a 5- or 6-membered heterocyclic group having 1 to 20 carbon atoms (for example, a 2-pyridyl, 4-pyridyl, 3-pyridyl, 2-benzothiazolyl, 2-(1-methyl-imidazolyl) or 4,6-dibutylamino-2-triazinyl group).

Preferred examples of $R^3$ include a hydrogen atom, an optionally substituted alkyl group having 1 to 30 carbon atoms, an optionally substituted phenyl group having 6 to 30 carbon atoms, an optionally substituted carbamoyl group having 1 to 30 carbon atoms, an optionally substituted alkoxycarbonyl group having 2 to 30 carbon atoms, an optionally substituted phenoxycarbonyl group having 7 to 30 carbon atoms, a carboxyl group, and a hydroxyl group. Preferred examples of the substituent(s) include those enumerated above as preferred substituents on $R^1$.

Particularly preferred examples of $R^3$ include an optionally substituted alkyl group having 1 to 20 carbon atoms (for example, a methyl, t-butyl or trifluoromethyl group), an optionally substituted phenyl group having 6 to 20 carbon atoms (for example, a phenyl, 4-methoxyphenyl or 3,5-dichlorophenyl group), a carboxyl group or a salt thereof, an optionally substituted carbamoyl group having 1 to 20 carbon atoms (for example, a carbamoyl, methylcarbamoyl, diethylcarbamoyl, pyrrolidinocarbonyl or 2-ethylhexylcarbamoyl group), an alkoxycarbonyl group having 2 to 20 carbon atoms (for example, an ethoxycarbonyl, hexadecyloxycarbonyl, t-butoxycarbonyl or cholesteryloxycarbonyl group), and a hydroxyl group.

Next, each substituent in the general formulae (III) and (IV) is explained in more detail below.

Pyridine, pyrimidine, pyrazine or triazine ring which is completed containing A may each have substituent(s) and/or combine with an aromatic ring such as a benzene ring or a cycloaliphatic ring such as a cyclohexane ring to form a condensed ring.

Methine group represented by L² may have substituent(s), and these substituents may combine to form a ring.

In preferred compounds among those represented by the general formulae (III) and (IV), rings completed containing A are pyridine, pyrimidine, pyrazine or triazine rings, or rings each formed by condensing a benzene ring to one of these rings. These rings may each be substituted with substituent(s) each having 30 or less carbon atoms. Examples of the substituent(s) include alkyl, aralkyl, aryl, hydroxyl, F, Cl, Br, I, cyano, nitro, alkoxy, aralkyloxy, aryloxy, acyl, acyloxy, acylamino, sulfonamido, aryloxycarbonyl, aralkyloxycarbonyl, alkoxycarbonyl, carbamoyl, sulfamoyl, carboxyl or carboxylato, sulfonic acid or sulfonato, carbamoylamino, sulfamoylamino, alkylsulfonyl, aralkylsulfonyl, arylsulfonyl, alkylsulfinyl, aralkylsulfinyl, arylsulfinyl, alkylthio, aralkylthio and arylthio groups, and these groups may further have substituent(s).

In preferred compounds among those represented by the general formulae (III) and (IV), L² is represented by the following general formulae (a') to (g'):

   General formula (a')

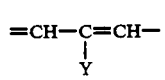   General formula (b')

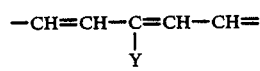   General formula (c')

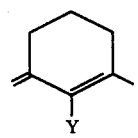   General formula (d')

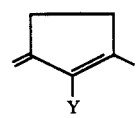   General formula (e')

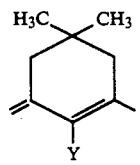   General formula (f')

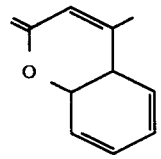   General formula (g')

In the general formulae (a') to (g'), Y is as defined in the general formulae (a) to (h).

In particularly preferred compounds among those represented by general formulae (III) and (IV), rings formed containing A are pyridine rings, pyrimidine rings, or quinoline rings which are each formed by condensation of a benzene ring on a pyridine ring. Preferred examples of substituent(s) on each ring include hydrogen atom(s), F, Cl, cyano group(s), optionally substituted alkyl group(s) having 1 to 20 carbon atoms (for example, methyl, t-butyl or trifluoromethyl group(s)), optionally substituted phenyl group(s) having 6 to 20 carbon atoms (for example, phenyl, 4-methoxyphenyl or 3,5-dichlorophenyl group(s)), optionally substituted aralkyl group(s) having 7 to 20 carbon atoms (for example, benzyl or 2-phenylethyl group(s)), optionally substituted carbamoyl group(s) having 1 to 20 carbon atoms (for example, butylcarbamoyl or dimethylcarbamoyl group(s)), substituted sulfonyl group(s) having 1 to 20 carbon atoms (for example, methanesulfonyl, benzenesulfonyl or dodecylbenzenesulfonyl group(s)), alkoxy group(s) having 1 to 20 carbon atoms (for example, methoxy, ethoxy or t-pentyloxy group(s)), optionally substituted aryloxy group(s) having 6 to 20 carbon atoms (for example, phenoxy, p-methoxyphenoxy, m-chlorophenoxy or 2,4-di-t-pentylphenoxy group(s)), and optionally substituted amino group(s) having 0 to 20 carbon atoms (for example, amino, dimethylamino, 2-ethylhexylamino, acetylamino, benzoylamino, methylsulfonylamino or phenylsulfonylamino group(s)). Particularly preferred examples of L² are groups represented by the general formulae (a'), (b') and (c'), and above all groups represented by these formulae wherein Y is a hydrogen atom or a lower alkyl group (for example, a methyl or ethyl group).

Specific examples of oxonol dyes represented by the general formulae (I) to (IV) as used in the present invention are enumerated below, but the scope of the invention should not be interpreted to be limited thereto.

First, specific examples of compounds represented by the general formula (I).

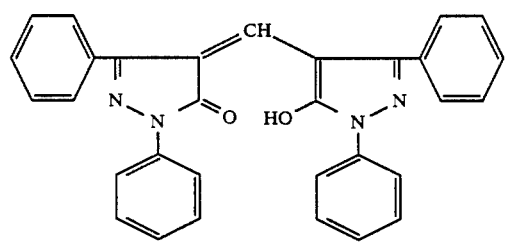
I-1.
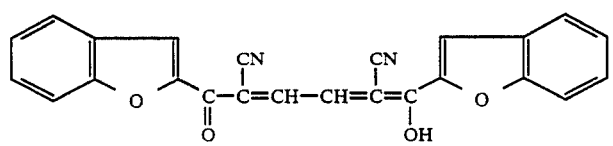
I-2.
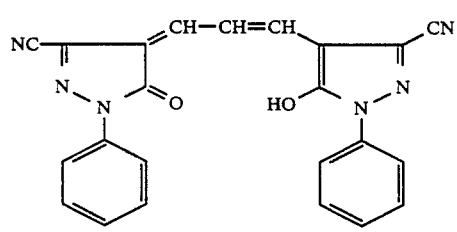
I-3.
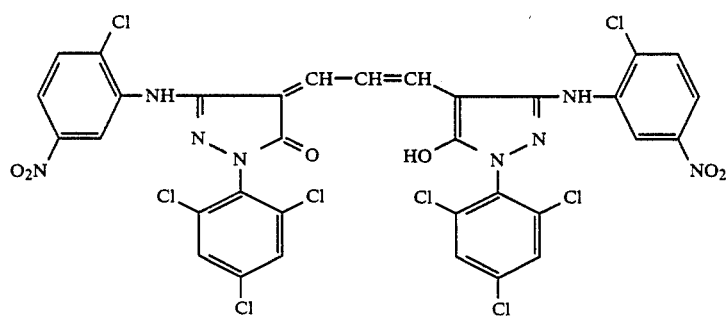
I-4.
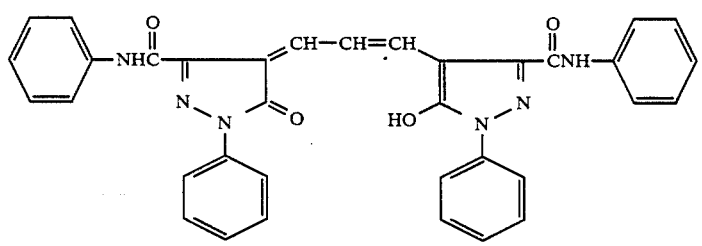
I-5.
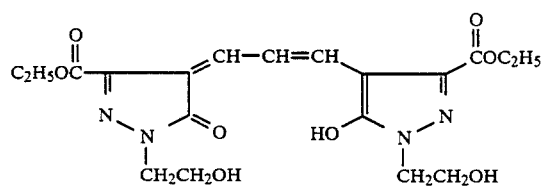
I-6.
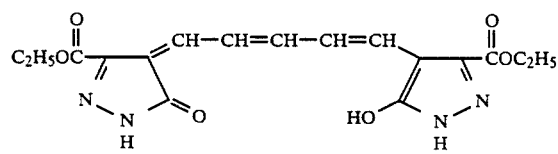
I-7

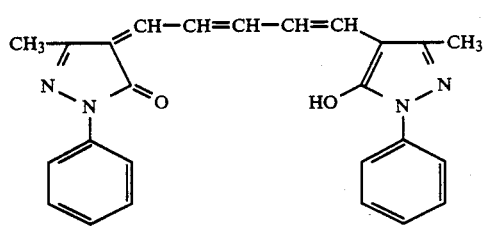
I-8
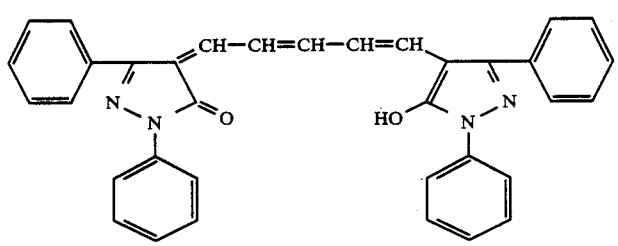
I-9
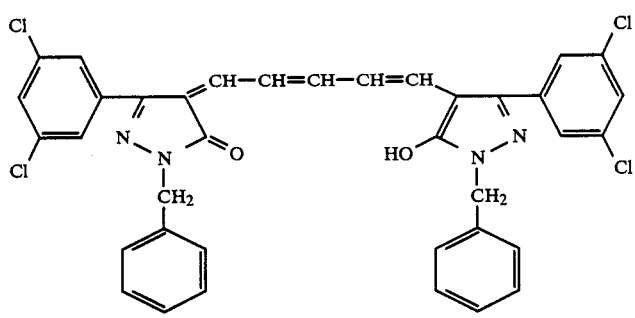
I-10
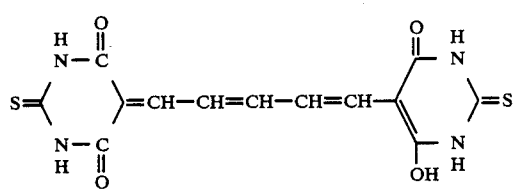
I-11
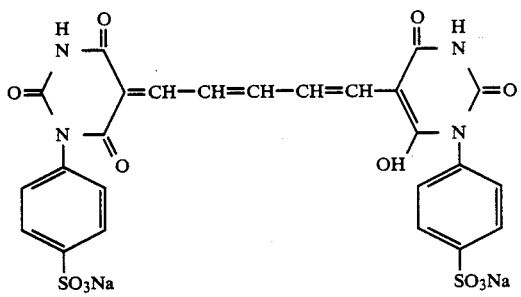
I-12
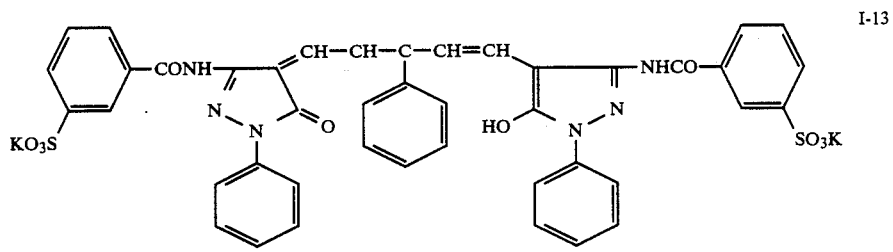
I-13

-continued
I-14
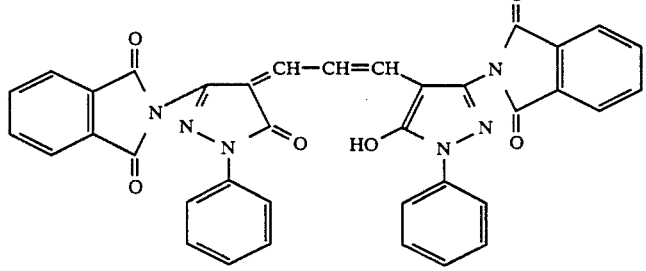
I-15
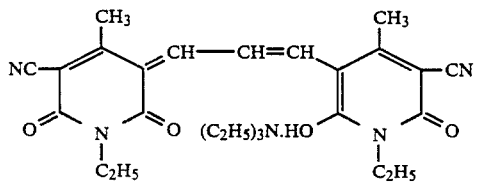
I-16
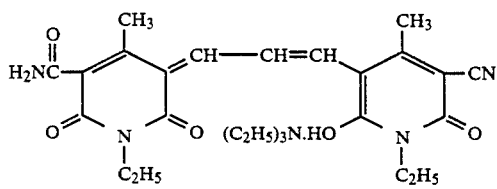
I-17
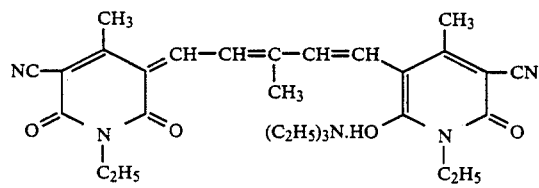
I-18
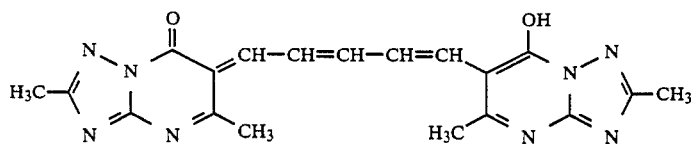
I-19
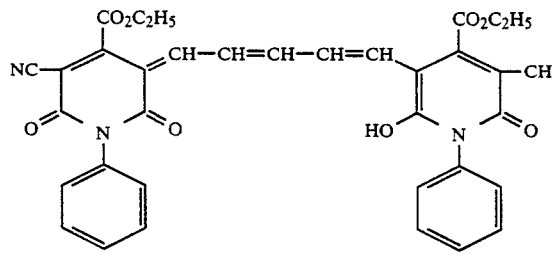
I-20
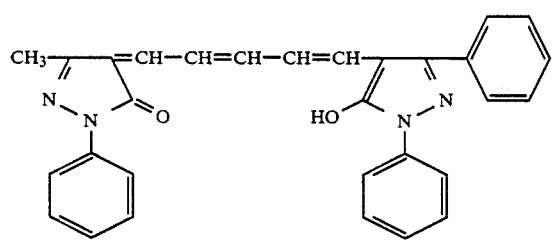

-continued
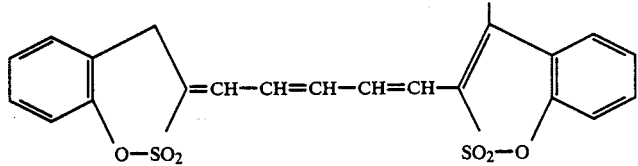
I-21
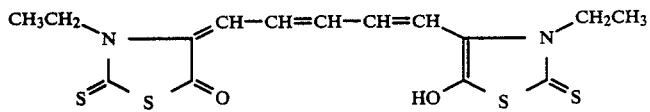
I-22
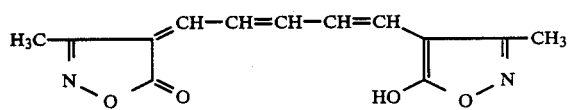
I-23
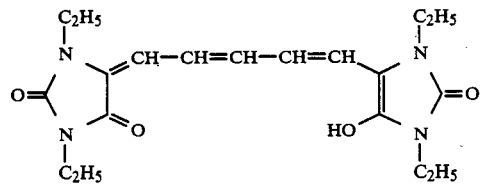
I-24
Compound 1 to 50 are exhibited below in Table 1 as specific examples of compounds of the general formula (II) wherein E represents 0 and a ring completed containing Q and Z is represented by the following general formula (A).
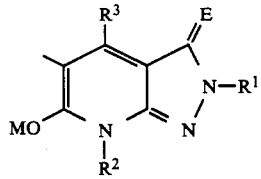
General formula (A)
wherein E, $R^1$, $R^2$ and $R^3$ are as defined in the general formula (II).

TABLE 1
| Compound | R¹ | R² | R³ | L | M |
|---|---|---|---|---|---|
| II-1 | 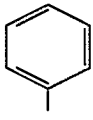 | CH₃ | CH₃ | =CH(CH=CH)₂ | H |
| II-2 | " | 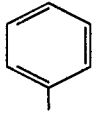 | " | " | " |
| II-3 | " | 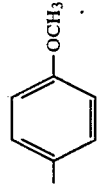 | " | " | " |
| II-4 | " | 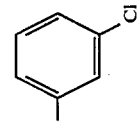 | " | " | " |
| II-5 | " | 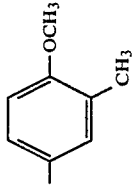 | " | " | " |
| II-6 | " | 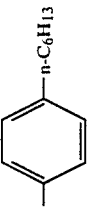 | " | " | " |
| II-7 |  | 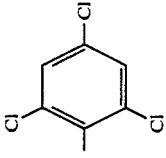 | " | " | " |

TABLE 1-continued

| Compound | R¹ | R² | R³ | L | M |
|---|---|---|---|---|---|
| II-8 | 2,5-dichlorophenyl | n-C₄H₉ | phenyl | " | " |
| II-9 | 2-pyridyl | CH₃ | CH₃ | " | " |
| II-10 | benzothiazol-2-yl | 4-methoxyphenyl | CH₃ | =CH$\leftarrow$CH=CH$\rightarrow_2$ | H |
| II-11 | CH₃ | CH₃ | CH₃ | " | " |
| II-12 | $\leftarrow$CH₂$\rightarrow_3$SO₃K | CH₃ | COOK | " | " |
| II-13 | 4-SO₃Na-phenyl | 3-SO₃Na-phenyl | COONa | " | " |
| II-14 | —CH₂—(4-SO₃K-phenyl) | 4-SO₃Na-phenyl—CH₂— | CH₃ | " | " |
| II-15 | $\leftarrow$CH₂$\rightarrow_3$SO₃K | $\leftarrow$CH₂$\rightarrow_3$SO₃K | COOK | " | " |
| II-16 | $\leftarrow$CH₂$\rightarrow_3$SO₃Na | —CH₂CH₂OH | COONa | =CH—CH=C(CH₃)—CH=CH— | " |
| II-17 | 2,4,6-trichlorophenyl | —CH₂CH(C₂H₅)—C₄H₉(n) | 4-methoxyphenyl | =CH$\leftarrow$CH=CH$\rightarrow_2$ | N(C₄H₉)₄ |

TABLE 1-continued
| Compound | R¹ | R² | R³ | L | M |
|---|---|---|---|---|---|
| II-18 | 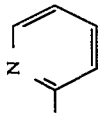 | " | —CONC₈H₁₇(n) | " | " |
| II-19 |  | CH₃ | H | 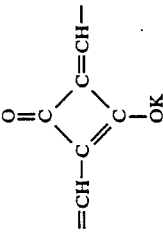 | " |
| II-20 | 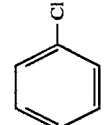 | 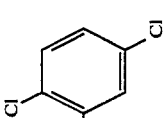 | CH₃ | =CH(CH=CH₂)₂ | " |
| II-21 | 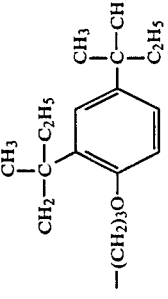 | C₂H₅ | 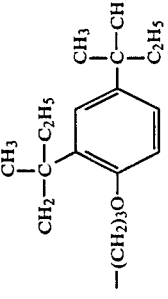 |  | H |
| II-22 |  | CH₃ | CH₃ |  | H |
| II-23 |  | —(CH₂)₃O— | CH₃ | =CH(CH=CH₂)₂ | " |
| II-24 |  | CH₃OCH₂CH₂— | —SO₂CH₃ | " | " |

TABLE 1-continued
| Compound | R¹ | R² | R³ | L | M |
|---|---|---|---|---|---|
| II-25 | CH₃ | 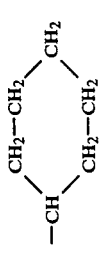 | −NHCCH₃ (with =O) | " | " |
| II-26 | −CH₂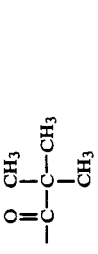 | −CH< (CH₂−CH₂−CH₂ / CH₂−CH₂) cyclohexyl | −NHSO₂ | " | " |
| II-27 | ₊(CH₂)₄SO₃K | −C(=O)−C(CH₃)₃ | −NHCNHCH₃ (with =O) | " | " |
| II-28 | 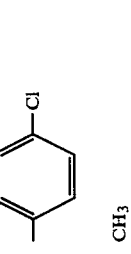 (4-Cl-phenyl) | CH₃ | −NHCN (with S=) | " | " |
| II-29 | 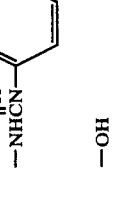 | CH₃ | −OH | " | " |
| II-30 | ₊(CH₂)₂SO₃K | ₊(CH₂)₄SO₃K | −O−CCH₂CH₂CCH₃ (with =O, =O) | " | " |
| II-31 |  | CH₃ | CH₃ | =CH−CH=CH− | H |
| II-32 | 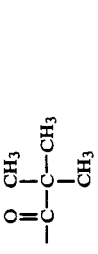 (2,5-diCl) | CH₃ | CH₃ | =CH−C(CH₃)=CH− | H |
| II-33 | ₊(CH₂)₄SO₃K | CH₃ | COOK | =CH−CH=CH− | " |

TABLE 1-continued

| Compound | R¹ | R² | R³ | L | M |
|---|---|---|---|---|---|
| II-34 | 3-SO₃K-phenyl | 4-OCH₃-phenyl | COOK | =CH—CH=CH— | " |
| II-35 | " | 4-OCH₃-phenyl | " | =CH— | " |
| II-36 | 4-CH₃-phenyl | 4-OCH₃-phenyl | CH₃ | =CH—CH=CH— | " |
| II-37 | phenyl | phenyl | CH₃ | =CH— | " |
| II-38 | 4-OCH₃-phenyl | CH₃ | phenyl | =CH—C(SO₂-phenyl)=CH— | " |
| II-39 | 2-pyridyl | CH₃ | CH₃ | =CH— | " |
| II-40 | 1-methylimidazol-2-yl | CH₂COCH₃ | CH₃ | =C(phenyl)— | " |
| II-41 | 4-n-C₄H₉-phenyl | 4-n-C₄H₉-phenyl | -C(CH₃)₃ | =CH(-CH=CH)₂ | " |

TABLE 1-continued

| Compound | R¹ | R² | R³ | L | M |
|---|---|---|---|---|---|
| II-42 | 3-methoxyphenyl (-C₆H₄-OCH₃) | 4-methylphenyl-NH- | 4-methylphenyl-NH- | =CH-C(CH₃)=CH-C(CH₃)₂-CH₂-C(CH₃)=CH- (cyclic) | H |
| II-43 | phenyl | CH₂C≡CH | CH₃ | =CH(CH=CH)₂- | " |
| II-44 | 4-(SO₃K)phenyl | CH₃ | CH₃ | =CH-CH=CH- | " |
| II-45 | 2-(SO₃K)benzyl (-CH₂-C₆H₄-SO₃K) | phenyl | CH₃ | " | " |
| II-46 | -CH₂CH₂SO₃K | -COCH₃ | COOK | " | K |
| II-47 | 2-(SO₃Na)benzyl (-CH₂-C₆H₄-SO₃Na) | -(CH₂)₂SO₃Na | COONa | " | " |
| II-48 | 4-(SO₃Na)phenyl | 4-methylphenyl | COONa | " | Na |
| II-49 | 4-(SO₃K)phenyl | CH₃ | COOK | " | " |

TABLE 1-continued
| Compound | R¹ | R² | R³ | L | M |
|---|---|---|---|---|---|
| II-50 | 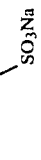SO₃Na, SO₃Na (on methylbenzene) | CH₃ | COONa | " | " |

Next, specific examples of compounds represented by the general formulae (III) and (IV) are mentioned.
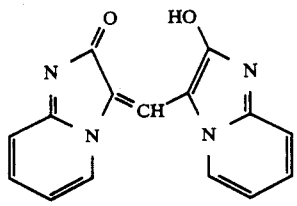 III-1
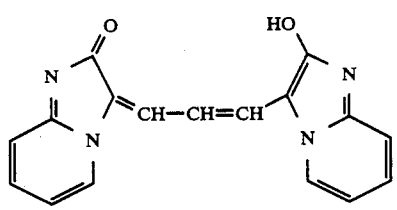 III-2
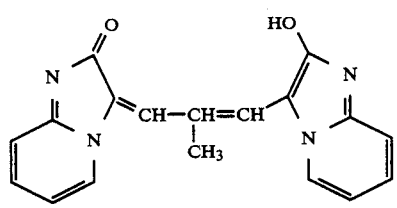 III-3
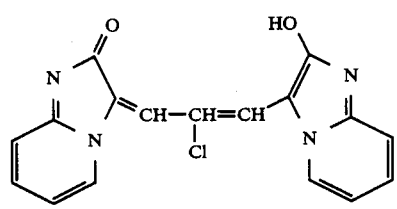 III-4
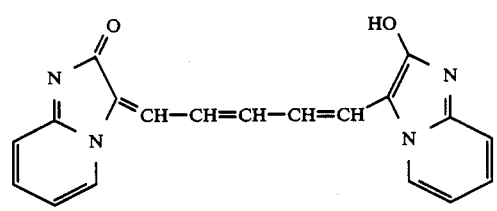 III-5
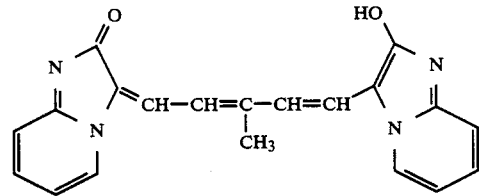 III-6
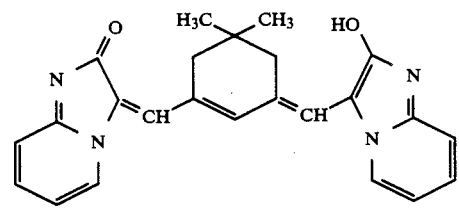 III-7

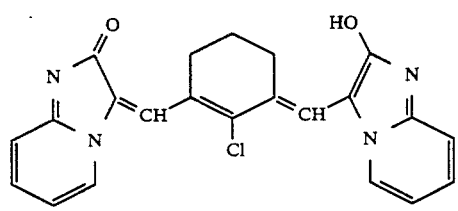
III-8
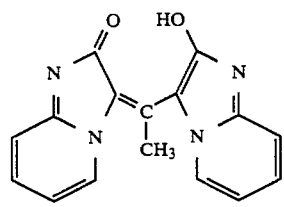
III-9
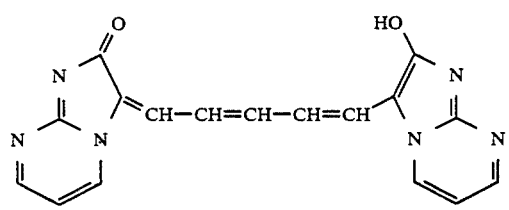
III-10
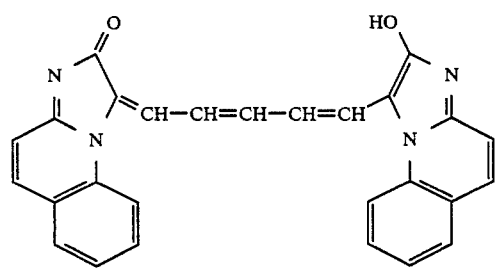
III-11
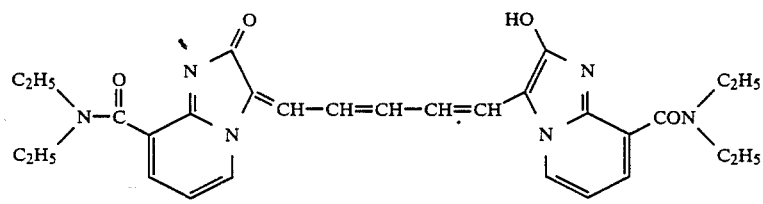
III-12
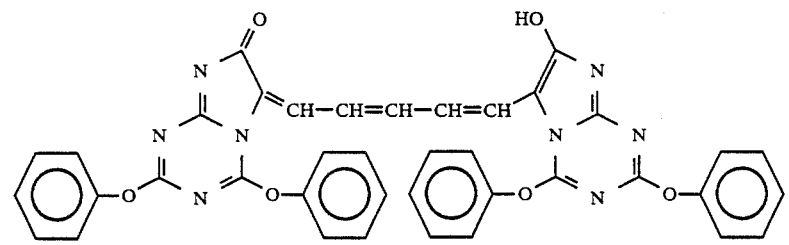
III-13
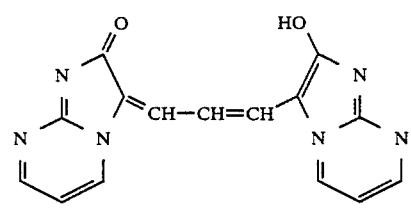
III-14

-continued
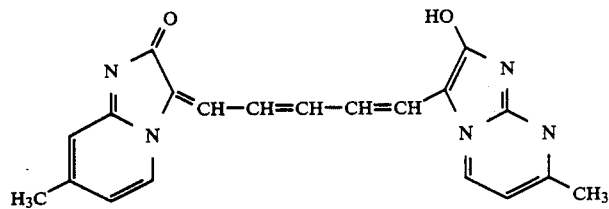 III-15
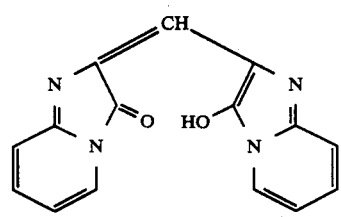 IV-1
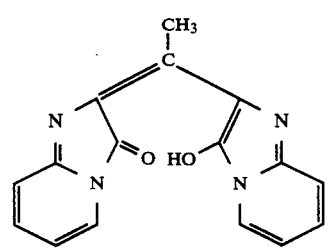 IV-2
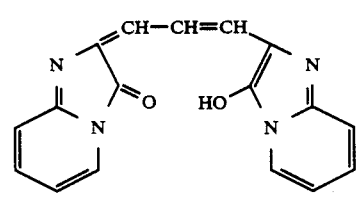 IV-3
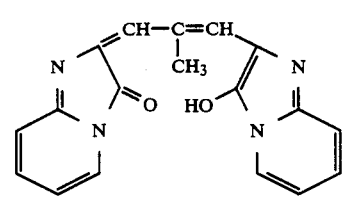 IV-4
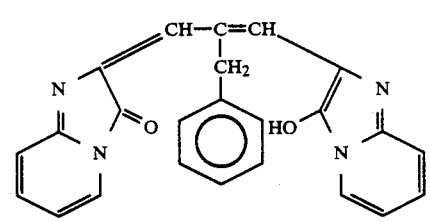 IV-5
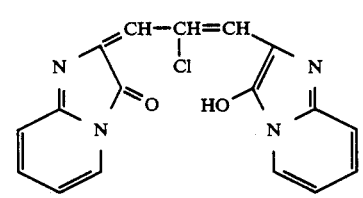 IV-6

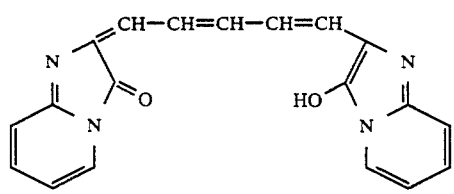
IV-7
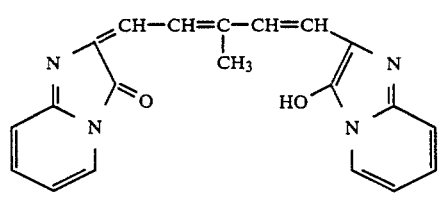
IV-8
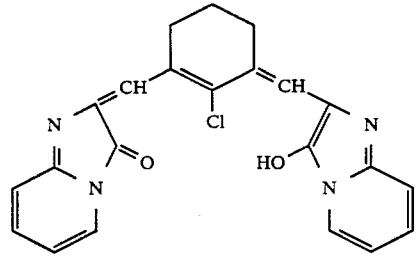
IV-9
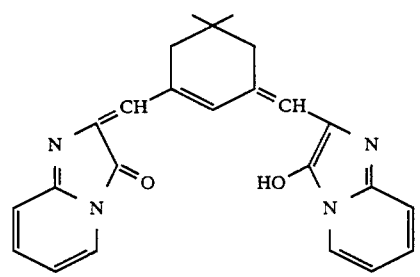
IV-10
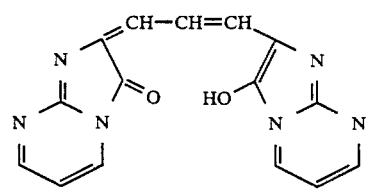
IV-11
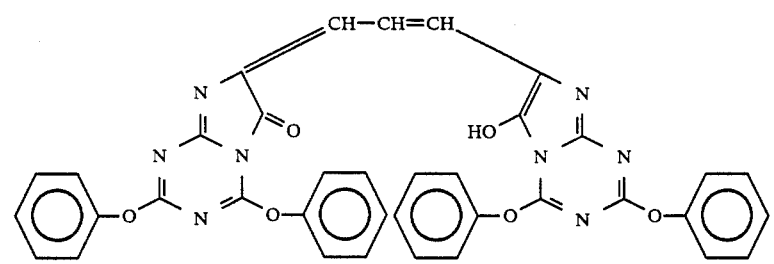
IV-12
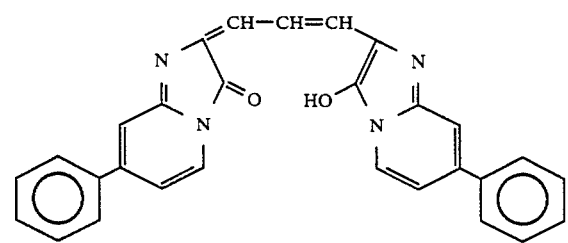
IV-13

-continued

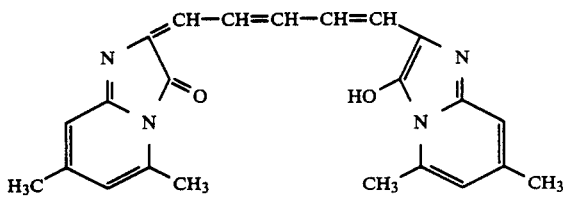
IV-14

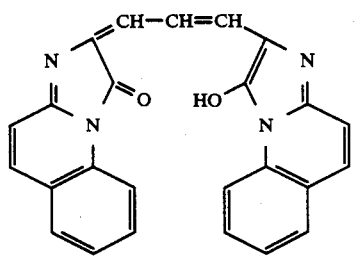
IV-15

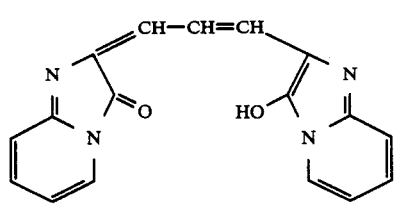
IV-16

An oxonol dye of the general formula (I) as used in the invention can be synthesized by reacting an active methylene compound with an orthoester or

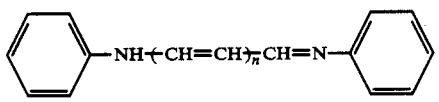

to link them through a methine chain. More specifically, these oxonol dyes can be synthesized using methods disclosed in Japanese Patent Publication for Opposition Purpose (hereinafter referred to as "J. P. KOKOKU") Nos. 39-22069, 43-3504, 52-38056, 54-38129 and 55-10059, J.P. KOKAI Nos. 49-99620 and 59-16834, U.S. Pat. No.4,187,225,and the like.

Melting points of representative compounds which were synthesized are shown below.

| Compound | Melting point (°C.) | Compound | Melting point (°C.) |
| --- | --- | --- | --- |
| I - 2 | 187–188 | I - 12 | 300 or more |
| I - 4 | 205–207 (decomposed) | I - 13 | 300 or more |
| I - 5 | 282–286 | I - 14 | 280 or more |
| I - 6 | 210–212 | I - 15 | 239–241 |
| I - 7 | 172–175 | I - 16 | 196–199 |
| I - 8 | 215–216 | | |

A compound of the general formula (II) can be synthesized by reacting a dioxopyrazolopyridine compound represented by the following general formula (V) with a proper methine source, trimethine source or pentamethine source compound (for example, ethyl orthoformate, 1,5-diphenyl-1,5-diaza-1,3-pentadiene, 1,5,5-trialkoxy-1,3-pentadiene, 1,7-diphenyl-1,7-diaza-1,3,5-heptatriene or the like) in a proper solvent such as methanol. The reaction is sometimes accelerated by addition of a basic substance such as triethylamine or an acid anhydride such as acetic anhydride. More specifically, the synthesis may be carried out utilizing a method disclosed in J.P. KOKOKU No. 39-22069, 43-3504, 52-38056, 54-38129 or 55-10059, J.P. KOKAI No. 49-99620 or 59-16834, U.S. Pat. No. 4,181,225 or the like.

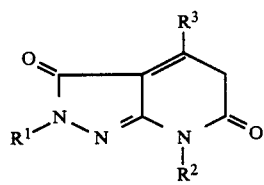
General formula (V)

wherein $R^1$, $R^2$ and $R^3$ are as defined in the general formula (II).

A compound of the general formula (V) may be synthesized by heating a compound represented by the following general formula (VI) and a compound represented by the general formula (VII) in an acidic condition.

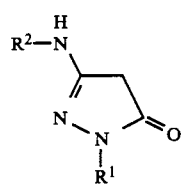
General formula (VI)

wherein $R^1$ and $R^2$ are as defined in the general formula (II).

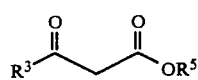
General formula (VII)

wherein R³ is as defined in the general formula (II), and R⁵ represents an alkyl group or an aryl group.

A compound represented by the general formula (V) may also be synthesized by alkylating, arylating or acylating a dioxopyrazolopyridine compound (general formula (VIII)) disclosed in J.P. KOKAI No. 52-112626.

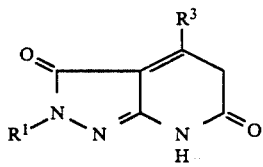

General formula (VIII)

wherein R¹ and R³ are as defined in the general formula (II).

It is a matter of course that functional group(s) of a compound represented by the general formula (II) or (V) can be changed to other functional groups by a known method.

Synthetic examples of compounds represented by the general formula (II) are exhibited below.

Synthetic example 1

Synthesis of compound II-2

1-Phenyl-3-anilino-2-pyrazolin-5-one (25 g), ethyl acetoacetate (18 g) and acetic acid (150 ml) were refluxed with heating for 6 hours. The reaction solution was diluted while water, and the resulting solid was crystallized from acetonitrile to obtain 10.9 g of 2,7-diphenyl-4-methylpyrazolo(3,4-b)pyridine-3,6-dione. Melting point 145°–147° C.

In a solution prepared by adding methanol (50 ml) and triethylamine (2.8 ml) to 2,7-diphenyl-4-methylpyrazolo(3,4-b) pyridine-3,6-dione (3.17 g), 1,7-diphenyl-1,7-diaza-1,3,5-heptatriene hydrochloride (2.85 g) was dissolved and then acetic anhydride (1.88 ml) was added, and the mixture was stirred at room temperature for one hour. The resulting precipitate was collected by filtration, washed with methanol and dried to obtain 5-[5-(N-acetylanilino)-2,3-pentadienylidene]-2,7-diphenyl-4-methylpyrazolo(3,4-b)pyridin-3, 6-dione (1.9). To these crystals (1.5 g), N,N-dimethylformamide (60 ml), 2,7-diphenyl-4-methylpyrazolo(3,4-b)pyridin-3,6-dione (0.95 g) and triethylamine (0.42 g) were added, and stirred at 50° C. for 2 hours. After a trace amount of insoluble matters were removed by filtration, ethyl acetate of 10-fold the volume of the filtrate was added thereto while stirring for crystallization. The resulting crystals were redissolved in a small amount of N,N-dimethylformamide, and a 10-fold volume of ethyl acetate was added thereto for crystallization. The resulting crystals were collected by filtration and dried to obtain compound II-2 (1.3 g). Gold crystals, melting point 300° C. or more, $\lambda_{max}^{DMF}$ 792 nm Synthetic example 2

Synthesis of compound II-1

3-Methylamino-1-phenyl-2-pyrazolin-5-one (1.9 g), ethyl acetoacetate (1.4 g) and acetic acid (8 ml) were refluxed while stirring for 6 hours. The reaction solution was diluted with water, and the resulting crystals were collected by filtration and washed with isopropyl alcohol to obtain 1.8 g of 4,7-dimethyl-2-phenylpyrazolo(3,4-b)pyridine-3,6-dione (melting point 179 - 181oC). In a solution of these crystals (1 g) in methanol (20 ml) and triethylamine (0.7 ml), 1,7-diphenyl-1,7-diaza-1,3,5-heptatriene hydrochloride (0.7 g) was dissolved, and then acetic anhydride (0.6 ml) was added, and the mixture was stirred at room temperature for one hour. The resulting precipitate was collected by filtration, washed with methanol and dried to obtain 5-[5-(N-acetylanilino)-2,3-pentadienylidene]-4,7-dimethyl-2-phenylpyrazolo(3,4-b)pyridine-3, 6-dione (0.2 g). To these crystals (0.15 g), N,N-dimethylformamide (5 ml) and 4,7-dimethyl-2-phenylpyrazolo-(3,4-b)pyridine-3,6-dione (0.08 g) were added, and stirred at 50° C. for 2 hours. After filtration of the reaction solution, the filtrate was diluted with water for crystallization. The resulting crystals were collected by filtration, washed with water and dried to obtain compound II-1 (0.2 g). Melting point 300° C. or more, $\lambda_{max}^{MeOH}$ 760 nm.

Synthetic example 3

Synthesis of compound II-4

Ethyl acetoacetate (2.8 g) and acetic acid (40 ml) were added to 3-(3-chlorohenylamino)-1-phenyl-2-pyrazolin-5-one (5.7 g) and refluxed while heating for 6 hours. The resulting crystals were collected by filtration, and washed with isopropyl alcohol to obtain 2 g of 7-(3-chlorophenyl)-4-methyl-2-phenylpyrazolo(3,4-b)pyridine-3,6-dione (melting point 278° to 282° C.). In a solution prepared by adding methanol (24 ml) and triethylamine (1.12 ml) to these crystals (1.4 g), 1,7-diphenyl-1,7-diaza-1,3,5-heptatriene hydrochloride (1.13 g) was dissolved, and then acetic anhydride (0.75 ml) was added, and the mixture was stirred at room temperature for one hour. The resulting precipitate was collected by filtration, washed with methanol and dried to obtain 5- 5-(N-acetylanilino)-2,3-pentadienylidene -7-(3-chlorophenyl)-4-methyl-2-phenylpyrazolo(3,4-b)pyridine-3,6-dione. To these crystals (0.5 g) were added N,N-dimethylformamide (30 ml), 7-(3-chlorophenyl)-4-methyl-2-phenylpyrazolo(3,4-b)pyridine-3,6-dione (0.32 g) and triethylamine (0.13 ml), and stirred at 50° C. for 2 hours. After filtration of the reaction solution, ethyl acetate of 10-fold the volume of the filtrate was added thereto while stirring for crystallization. The resulting crystals were redissolved in a small amount of N,N-dimethylformamide, and a 10-fold volume of ethyl acetate was added thereto for crystallization. The resulting crystals were collected by filtration, washed with ethyl acetate and dried to obtain compound II-4 (0.4 g). Melting point 300° C. or more, $\lambda_{max}^{meOH}$ 762 nm.

Synthetic example 4

Synthesis of compound II-3

Ethyl acetoacetate (8.5 g) and acetic acid (75 ml) were added to 3-(4-methoxyphenylamino)-1-phenyl-2-pyrazolin-5-one (14 g) and refluxed while heating for 6 hours. The reaction solution was poured into 150 ml of water, and the resulting solid was dissolved in a mixture of methanol (500 ml) and acetone (150 ml) while heating. The solution was cooled to obtain 8.4 g of 7-(4-methoxyphenyl)-4-methyl-2-phenylpyrazolo(3,4-b)pyridine-3,6-dione (melting point 189°–190° C.). In a solution prepared by adding methanol (40 ml) and triethylamine (2.8 ml) to these crystals (3.47 g) was dissolved, 1,7-diphenyl-1,7-diaza-1,3,5-heptatriene hydrochloride (2.85 g), and then acetic anhydride (1.88 ml) was added thereto, and stirred at room temperature for one hour. The resulting precipitate was collected by filtration, washed with methanol and dried to obtain 5-[5-(N-acetylanilino)-2,3-pentadienylidene]-7-(4-methoxyphenyl)-4-methyl-2-phenylpyrazolo(3,4-b)pyridine-3,6-dione (4.1 g). N,N-dimethylformamide (40 ml), 7-(4-methoxyphenyl)-4-methyl-1-phenyl- 2-pyrazolin-5-one (2.4 g) and triethylamine (0.98 ml) were added to these crystals (3.8 g), and stirred at 50° C. for 2 hours. After filtration of the reaction solution, 10-fold volume of ethyl acetate was added for crystallization. The crystals were recrystallized from acetonitrile to obtain compound II-3 (1.0 g). Melting point 260° C. (decomposed).

Synthetic example 5

Synthesis of compound II-5

The procedure of synthetic example 1 was repeated except that 3-(3-methyl-4-methoxyphenylamino)-1-phenyl-2-pyrazolin-5-one was used in place of 1-phenyl-3-anilino-2-pyrazolin-5-one to obtain compound II-5. Melting point 300° C. or more.

Synthetic example 6

Synthesis compound II-6

The procedure of synthetic example 1 was repeated except that 3-(4-n-hexylphenylamino)-phenyl-2-pyrazolin-5-one was used in place of 1-phenyl-3-anilino-2-pyrazolin-5-one to obtain compound II-6.

Synthetic example 7

Compounds II-12 to 16, 27, 30, 33 to 35 and 44 to 60 were synthesized in a similar manner. Melting points of the resulting compounds are all 300° C. or more.

Compounds represented by the general formula (III) can be synthesized according to the method disclosed in U.S. Pat. No. 2,514,649. Further, compounds represented by the general formula (IV) can be synthesized by the method disclosed in Journal of the Chemical Society, 1360 to 1364 (1956). In a generic synthetic method, a compound of the general formula (III) or (IV) can be synthesized by reacting a compound represented by the following general formula (IX) or (X) with a proper methine source, trimethine source or pentamethine source compound (for example, ethyl orthoformate, 1,5-diphenyl-1,5-diaza-1,3-pentadiene, 1,5,5-trialkoxy-1,3-pentadiene or 1,7-diphenyl-1,7-diaza-1,3,5-heptatriene) in a proper solvent such as methanol, ethanol, pyridine or N,N-dimethylformamide. The synthetic reaction may sometimes be accelerated by the addition of a basic substance or an acid anhydride such as acetic anhydride.

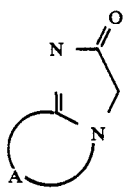

General formula (IX)

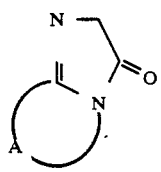

General formula (X)

wherein A is as defined in the general formulae (III) and (IV).

Oxonol dyes used in optical recording media of the invention may be used alone or in combination of 2 or more, or may be used together with dyes other than oxonol dyes of the invention. Further, it is also effective to use various antioxidants or singlet oxygen quenchers together therewith for enhancement of reading durability. Further, various resins may also be used together.

It is also possible to increase reading durability by forming chelate compounds with oxonol dyes of the invention by addition of transition metal ions.

Various quenchers may be used in the invention, but preferred ones are transition metal complexes which lower deterioration by reproduction and have good compatibility with dyes. Preferred center metals are Ni, Co, Cu, Pd, Pt and the like.

Examples of novel quenchers which may be used in the invention include quenchers represented by the formulae (XI) and (XII):

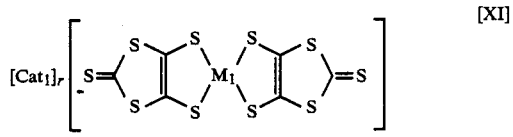

[XI]

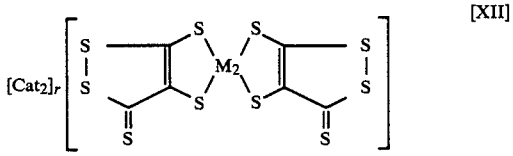

[XII]

wherein [Cat$_1$] and [Cat$_2$] each represent a cation necessary for making each complex neutral, M$_1$ and M$_2$ each represent nickel, copper, cobalt, palladium or platinum, and r represents 1 or 2.

Examples of an inorganic cation in the cation represented by [Cat$_1$] or [Cat$_2$] in the aforesaid general formula (XI) or (XII) include alkali metal ions such as Li$^+$, Na$^+$ and K$^+$, alkaline earth metal ions such as Mg$^{2+}$, Ca$^{2+}$ and Ba$^{2+}$, and NH$^{4+}$.

Further, examples of an organic cation therein include quaternary ammonium ions and quaternary phosphonium ions.

Preferred cations among the above cations [Cat$_1$] and Cat$_2$] are those represented by the following general formula (XIII-a), (XIII-b), (XIII-c), (XIII-d) or (XIII-e):

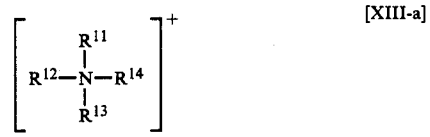

[XIII-a]

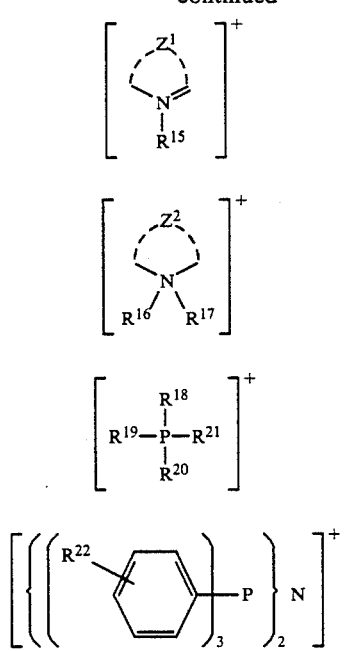

wherein $R^{11}$, $R^{12}$, $R^{13}$, $R^{14}$, $R^{15}$, $R^{16}$, $R^{17}$, $R^{18}$, $R^{19}$, $R^{20}$, $R^{21}$ and $R^{22}$ each represents a substituted or unsubstituted alkyl group having 1 to 20 carbon atoms, or a substituted or unsubstituted aryl group having 6 to 14 carbon atoms, and $Z^1$ and $Z^2$ each represent a nonmetal atomic group which forms a 5-membered or a 6-membered ring together with a nitrogen atom or a phosphorus atom in each formula.

The above substituted or unsubstituted alkyl group having 1 to 20 carbon atoms includes, for example a methyl group, an ethyl group, a n-butyl group, an isoamyl group, a n-dodecyl group and n-octadecyl group. The aryl group having 6 to 14 carbon atoms include, for example a phenyl group, a tolyl group and an α-naphthyl group.

These alkyl groups and aryl groups may each be substituted with a cyano group, a hydroxyl group, an alkyl group having 1 to 20 carbon atoms (e.g., a methyl group, an ethyl group, an n-butyl group or an n-octyl group), an aryl group having 6 to 14 carbon atoms (e.g. a phenyl group, a tolyl group or an α-naphthyl group), an acyloxy group having 2 to 20 carbon atoms (e.g., an acetoxy group, a benzoyloxy group or p-methoxybenzoyloxy group), an alkoxy group having 1 to 6 carbon atoms (e.g., a methoxy group, an ethoxy group, a propoxy group or a butoxy group), an aryloxy group (e.g., a phenoxy group or a tolyloxy group), an aralkyl group (e.g., a benzyl group or a phenethyl group), an alkoxycarbonyl group (e.g., a methoxycarbonyl group, an ethoxycarbonyl group or an n-butoxycarbonyl group), an aryloxycarbonyl group (e.g., a phenoxycarbonyl group or a tolyloxycarbonyl group), an acyl group (e.g., an acetyl group or a benzoyl group), an acylamino group (e.g., an acetylamino group or a benzoylamino group), an optionally substituted carbamoyl group (e.g., an N-ethylcarbamoyl group or an N-phenylcarbamoyl group), an alkylsulfonylamino group (e.g., a methylsulfonylamino group), an optionally substituted arylsulfonylamino (e.g., a phenylsulfonylamino group), an optionally substituted sulfamoyl group (e.g., an N-ethylsulfamoyl group or an N-phenylsulfamoyl group), an alkyl- or arylsulfonyl group (e.g., a mesyl group or a tosyl group) or the like.

$Z^1$ and $Z^2$ each represent a nonmetal atomic group necessary for forming a 5-membered ring or a 6-membered ring as aforesaid. Examples of these 5-membered ring and 6-membered ring may include a pyridine ring, an imidazole ring, a pyrrole ring, a 2-pyrroline ring, a pyrrolidine ring, a piperidine ring, a pyrazole ring, a pyrazoline ring, an imidazoline ring and the like.

Cations represented by the general formula (XIII-b) may include, for example, a dodecylpyridinium group, a hexadecylpyridinium group and a dodecylimidazolium group. Cations represented by the general formula (XIII-c) may include; for example, an N-ethyl-N-hexadecylpiperidinium group, an N-ethyl-N-dodecylpyrazolidinium group.

Cations preferably used in the invention among cations represented by the above general formulae (XIII-a), (XIII-b), (XIII-c), (XIII-d) and (XIII-e) are (XIII-a), (XIII-b), (XIII-d) and (XIII-e) in view of availability of the raw materials and preparation cost.

The kind of these cations [Cat1] and [Cat2] has influence on the solubilities of the compounds represented by the aforesaid general formula (XI) or (XII) in organic solvents.

In general, when substituents linking to the quaternary hetero atom are alkyl groups, groups, the solubility of the compound increases as the chain lengths of the alkyl groups become longer. This tendency is remarkable in the case of tetraalkyl substituted ammonium or tetraalkyl substituted phosphonium, and cations having a total carbon number of 17 or more in case of ammonium cations and cations having a total carbon number of 4 or more in the case of phosphonium cations each bestow high solubilities on the compounds.

Enumeration of $M_1$ or $M_2$ in the compounds represented by the aforesaid general formula (XI) or (XII) in order of preference is nickel, cobalt, copper, palladium and platinum.

The metal complexes of the general formula (XI) or (XII) have stereostructures of plane four coordination. Though it cannot be definitely determined whether the thioketone groups in the compounds of the general formula (XII) exist symmetrically or unsymmetrically in relation to the center metal, the thioketone groups are represented for convenience's sake as in the general formula (XII) in the present specification.

The compounds represented by the aforesaid general formula (XI) or (XII) may be synthesized as follows.

A compound of the general formula (XI) (n=2): Disodium 1,3-dithiol-2-thione-4,5-dithiolate obtained by reacting carbon disulfide with sodium is converted to a zinc complex, and benzoyl chloride is reacted with the complex to form a bisbenzoylthio compound. After decomposition with an alkali, the bisbenzoylthio compound is reacted with a metal salt to obtain the captioned compound.

Further, a compound of the general formula (XI) (n=1) may be obtained by oxidizing a complex obtained as above-described (n=2) with a proper oxidizing agent.

A compound of the general formula (XII) (n=2): First, disodium 1,3-dithiol-2-thione-4,5-dithiolate obtained by reaction of carbon disulfide with sodium is heated to above 130° C. to isomerize it to disodium 1,2-dithiol-3-thione-4,5-dithiolate. Then, this dithiolate is converted to a zinc complex, and benzoyl chloride is reacted with the zinc complex to form a bisbenzoylthio compound, which is the decomposed with an alkali and reacted with a metal salt to obtain the captioned compound.

A compound of the general formula (XII) (n=1) may be obtained by oxidizing a complex obtained as above-described (n=2) with a proper oxidizing agent.

Further, the 1,3-dithiol-2-thione-4,5-dithiolate anion which is an intermediate for obtaining a compound of the general formula (XI) or (XII) may also be obtained by electrochemical reduction besides the Na-reduction method described above.

Preferred compounds among those represented by the aforesaid general formulae (XI) are illustrated as follows.

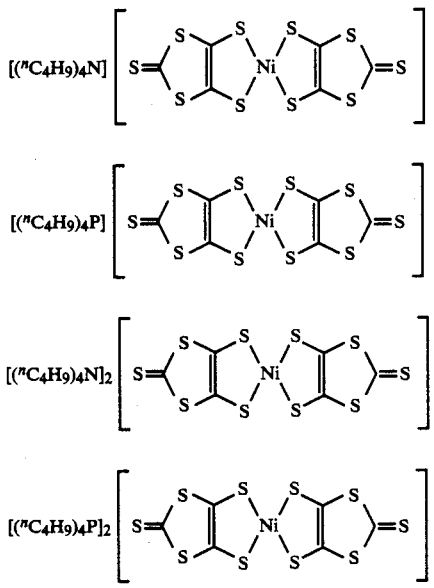

Synthetic examples of compounds represented by the general formula (XI) are described as follows.

Synthetic example 8

Synthesis of exemplified compound (XI-4)

(1-1) Synthesis of bis(tetraethylammonium)bis(1,3-dithiol-2-thione-4,5-dithiolato)zinc complex All reaction procedures were conducted under an argon atmosphere. 23 g of sodium was cut into small pieces and dispersed in 180 ml of carbon disulfide, followed by dropwise addition in a slow speed of 200 ml of dimethylformamide thereto with stirring. During the dropwise addition, caution should be given so that the mixture does not rapidly generate heat. After the dropwise addition of dimethylformamide, the mixture was gently heated with caution and refluxed for 24 hours. After completion of the reaction the unreacted sodium was removed by filtration. Then, 50 ml of ethanol was added to the filtrate, and the mixture was stirred at room temperature for 2 hours. Carbon disulfide was distilled away from this solution at room temperature under reduced pressure. Then, 300 ml of water was slowly added dropwise thereto and the resulting solution.

Separately in advance, 20 g of zinc chloride was dissolved in 500 ml of methanol and 500 ml of concentrated ammonia water was added thereto to prepare a solution. This solution was added to the above filtrate at room temperature. After stirring for 5 minutes, an aqueous solution of 53 g of tetraethylammonium bromide in 250 ml of water was added to the mixture to immediately form a red precipitate, which was recovered by filtration and air-dried to obtain the captioned zinc complex.

(1-2) Synthesis of 4,5-bis(benzoylthio)-1,3-dithiol-2-thione 22 g of the zinc complex obtained in (1-1) was dissolved in 500 ml of acetone and filtered. 150 ml of benzoyl chloride was added to the filtrate with stirring to form immediately a yellow precipitate. The precipitate was recovered by filtration, washed with water and air-dried to obtain 16 g of the captioned compound.

(1-3) Synthesis of exemplified compound (XI-4)

9.2 g of the bis(benzoylthio) compound obtained in (1-2) was dissolved in 50 ml of methanol. Then, 6.3 g of a 28% methanol solution of sodium methoxide was added thereto, followed by stirring for 10 minutes. To this solution was added a solution of 2.4 g of nickel chloride hexahydrate in 50 ml of methanol, and the mixture was stirred at room temperature for 30 minutes. To the resulting solution was added a solution of 8.5 g of tetrabutylphosphonium bromide in 100 ml of methanol to form immediately a black precipitate. The mixture was stirred for additional 20 minutes and filtered. The solid was washed with acetone, air-dried and recrystallized from acetone-isopropyl alcohol to obtain the captioned compound. Yield 3.8 g.

Synthetic example 9

Synthesis of exemplified compound (XI-2)

1 g of the nickel complex obtained in (1-3) was dissolved in 60 ml of acetone, and 30 ml of acetic acid was added thereto. The mixture was stirred for 3 hours and the solvent was distilled away to form black crystals, which was then recrystallized from acetone-methanol to obtain the desired exemplified compound (XI-2) Yield 0.4 g, M.P. 185° C., λmax: 1125 nm, εmax: 2.51×10$^4$ (in CH$_2$Cl$_2$)

Examples of known quenchers which may be used in the invention include the following compounds disclosed in J. P. KOKAI No. 59-178295.

(i) Bisdithio-α-diketone series

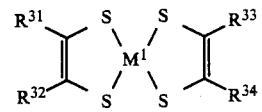

wherein $R^{31}$ to $R^{34}$ each represent an alkyl group or an aryl group, and $M^1$ represents a divalent transition metal atom.

(ii) Bisphenyldithiol series

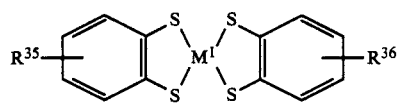

wherein $R^{35}$ and $R^{36}$ each represent an alkyl group or a halogen atom, and $M^1$ represents a divalent transition metal atom.

(iii) Acetylacetonate chelate series
(iv) Dithiocarbamic acid chelate series
(v) Bisphenylthiol series
(vi) Thiocatechol chelate series (vii) Salicylaldehyde oxime series
(viii) Thiobisphenolate chelate series
(ix) Phosphonous acid chelate series
(x) Benzoate series
(xi) Hindered amine series
(xii) Transition metal salts.

Besides the above compounds, aminium series or diimonium series compounds represented by the following formula may also be used in the invention as known quenchers.

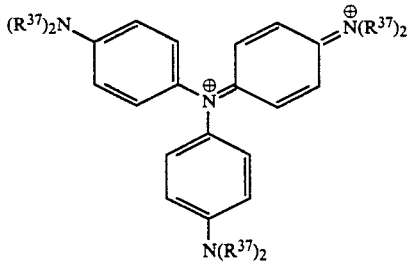

wherein $R^{37}$ represents an alkyl group or an aryl group. Specific examples thereof include IRG-002, IRG-003, IRG-022 and IRG-033 each manufactured by NIPPON KAYAKU CO., LTD.

A linkage compound of a cation of a dye of the general formulae (I) to (IV) to an anion of a quencher may also be used in the invention.

A quencher is generally used in an amount of 0.05 to 12 moles, preferably 0.1 to 1.2 moles per 1 mole of dye(s) selected from those of the general formulae (I) to (IV).

Though a quencher is preferably contained in the thin dye film recording layer, it may be contained in a layer different from the recording layer. It is possible to provide a subbing layer on the support, a protective layer on the recording layer, and/or a reflective layer on the support or on the recording layer in an optical recording medium of the invention.

Known supports may arbitrary be used as a support. Representative examples thereof are glasses and plastics such as acryls, polycarbonates, polysulfones, polyimides, amorphous polyolefins, epoxy resins, polyesters and the like. The support may be used in various shapes such as disc-like, cardlike, sheet-like and roll film-like shapes.

A groove may be formed on the glass or plastic support in order to make tracking during recording easy. Further, a subbing layer of a plastic binder, or an inorganic oxide, an inorganic sulfide or the like may be provided on the glass or plastic support. A subbing layer having a thermal conductivity lower than the support is preferable. Further, it is also possible to make two recording media facing with each other so that both recording layers are inside, namely to make two recording media so-called air sandwich structure.

The recording layer in the invention may be formed, for example, by dissolving dye(s) selected from those represented by the general formulae (I) to (IV) and a quencher in an organic solvent (for example, methanol, ethanol, isopropyl alcohol, a fluorinated alcohol such as 2,2,3,3-tetrafluoropropanol, dichloromethane, dichloroethane or acetone), and, if necessary, adding a proper binder (for example, PVA, PVP, polyvinyl butyral, polycarbonate, nitrocellulose, polyvinyl formal, methyl vinyl ether, chlorinated paraffin, maleic anhydride copolymer, styrene-butadiene copolymer or xylene series resin), and applying the solution (for example by spin coating) onto a support. The recording layer may also be formed by co-depositing dye(s) selected from those of the general formulae (I) to (IV) and a quencher on a support, or by vacuum-depositing such dye(s) and then applying a quencher. When a binder is used, it is preferable to use it in an amount of 0.01 to 2 times the weight of the dye. Further, it is also possible to form a thin film according to Langmuir-Blodgett's technique using dye(s) selected from those of the general formulae (I) to (IV).

It is possible to provide one or more of the recording layers in the invention.

An antioxidant or a fading inhibitor may be contained in the recording layer or a layer adjacent thereto in order to inhibit deterioration of the dye(s).

Film thickness of the recording layer is usually in the range of 0.01 to 2 $\mu$m, preferably in the range of 0.02 to 0.8 $\mu$m. In the case of reflection reading it is particularly preferable that the thickness is an odd number times the $\frac{1}{4}$ of the laser wave length used for reading.

When a layer for reflecting semiconductor laser, He-Ne laser or the like is provided, the optical recording medium of the invention may be made either by providing a reflecting layer on a support and then providing a recording layer on the reflecting layer in such a manner as aforementioned, or by providing a recording layer on a support and then providing a reflecting layer thereon.

The reflecting layer may be provided in such a manner as described below besides a sputtering method, an ion plating method or the like.

For example, a solution which is prepared by dissolving a metal salt or a metal complex salt in a water soluble resin (PVP, PVA or the like) and further adding a reducing agent thereto is applied onto a support and the resulting support is dried while heating at 50° to 150° C., preferably 60° to 100° C., whereby a reflecting layer is provided thereon.

The metal salt or the metal complex salt is used in a weight ratio of 0.1 to 10, preferably 0.5 to 1.5 based on the resin. Further, as for the thickness of the recording layer, it is proper that the thickness of the metal particle reflecting layer is in the range of 0.01 to 0.1 $\mu$m and that of the light absorption layer is in the range of 0.01 to 1 $\mu$m.

Usable metal salts and metal complex salts include silver nitrate, potassium silver cyanide, potassium gold cyanide, silver ammine complex, silver cyan complex, gold salt or gold cyan complex and the like. Usable reducing agents include formalin, tartaric acid, a tartrate, a hypophosphate, sodium borohydride, dimethylamine borane and the like. The reducing agent may be used in the range of 0.2 to 10 moles, preferably 0.5 to 4 moles per 1 mole of the metal salt or the metal complex salt.

In the optical recording medium of the invention, the recording of information is conducted by applying a spot-like high energy beam such as laser (for example, semiconductor laser and He-Ne laser) onto the recording layer through the support or from the opposite side of the support. That is to say, light absorbed in the recording layer is converted to heat and pits are formed in the recording layer.

On the other hand, reading of information is conducted by applying a laser beam with a low power of the threshold value energy or less for recording, and detecting the difference in quantity of reflected light or quantity of transmitted light between pitted areas and unpitted areas.

The present invention is further explained in detail below according to the examples.

EXAMPLE 1

A dye and a quencher, and a binder when needed, each shown in Table 2 were dissolved in a mixed solvent of methanol, methyl ethyl ketone and dichloroethane in a proper ratio. A surface-hardened polycarbonate support with a groove (pitch 1.6μ, depth 750 Å) was coated with the solution to a thickness of 0.1 μm using a spinner, and dried. The weight ratio of the dye and quencher was 3:1, and in the case of using a binder, the weight thereof was 1/5 of the dye.

The following evaluation conditions were applied.

| Recording and readout | |
|---|---|
| Laser : | Semiconductor laser (GaAlAs) |
| Wavelength of laser : | 780 nm |
| Beam size of laser : | 1.6 μm |
| Line speed : | 5 m/s |
| Recording power : | 8 mW |
| Recording frequency : | 2.5 MHz |
| Recording duty : | 50% |
| Readout power : | 0.4 mW |
| Evaluation of readout deterioration | |
| Readout power : | 1.0 mW |
| Readout number : | $10^5$ times |
| Evaluation of deterioration during preservation | |
| Preservation temperature and humidity : | 60° C., 90% RH |
| Preservation time : | 30 days |

The results are shown in Table 2.

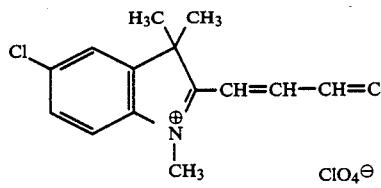 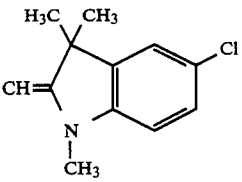

Comparative compound A

TABLE 2

| Test No. | Dye | Quencher | Binder | C/N (dB) | After the forced deterioration test C/N (dB) | | Note |
|---|---|---|---|---|---|---|---|
| | | | | | 60° C., 90% RH | 0.8 mW Continuous readout | |
| 1 | A | — | — | 54 | 45 | 42 | Comparative example |
| 2 | " | XI-2 | — | 52 | 45 | 48 | Comparative example |
| 3 | " | — | Polystyrene | 50 | 46 | 42 | Comparative example |
| 4 | " | XI-4 | Chlorinated paraffin | 52 | 46 | 48 | Comparative example |
| 5 | IV-7 | — | — | 53 | 50 | 50 | Present invention |
| 6 | " | XI-2 | — | 51 | 50 | 50 | Present invention |
| 7 | " | — | Nitrocellulose | 50 | 49 | 47 | Present invention |
| 8 | " | XI-4 | Polyethyl acrylate | 51 | 50 | 50 | Present invention |
| 17 | I-17 | — | — | 54 | 52 | 50 | Present invention |
| 18 | " | XI-2 | — | 52 | 50 | 51 | Present invention |
| 19 | " | — | Polyvinyl alcohol | 51 | 50 | 48 | Present invention |
| 20 | " | XI-4 | Nitrocellulose | 51 | 50 | 50 | Present invention |
| 21 | I-18 | — | — | 54 | 53 | 51 | Present invention |
| 22 | " | XI-2 | — | 50 | 48 | 50 | Present inven- |

TABLE 2-continued

| Test No. | Dye | Quencher | Binder | C/N (dB) | After the forced deterioration test C/N (dB) | | Note |
|---|---|---|---|---|---|---|---|
| | | | | | 60° C., 90% RH | 0.8 mW Continuous readout | |
| 23 | " | — | Polybutyl acrylate | 50 | 49 | 47 | Present invention |
| 24 | " | XI-4 | Polymethyl methacrylate | 51 | 50 | 50 | Present invention |
| 25 | I-19 | — | — | 55 | 53 | 51 | Present invention |
| 26 | " | XI-2 | — | 52 | 50 | 51 | Present invention |
| 27 | " | — | Nitrocellulose | 51 | 50 | 48 | Present invention |
| 28 | " | XI-4 | Chlorinated paraffin | 52 | 51 | 51 | Present invention |

EXAMPLE 2

A dye, a quencher and a binder in case of use each listed in Table 3 were dissolved in a mixed solvent of methanol, methyl ethyl ketone dichloroethane and 2,2,3,3-tetrafluoropropanol in a proper mutual cation. A surface-hardened polycarbonate support with a groove (pitch 1.6 μ, depth 750 Å) was coated with the solution to a thickness of 0.1 μm using a spinner, and dried. The weight ratio of the dye and quencher was 3:1, and in case of using a binder, the weight thereof was 1/5 of the dye.

Evaluation conditions were the same as in Example 1.

TABLE 3

| Test No. | Dye | Quencher | Binder | C/N (dB) | After the forced deterioration test C/N (dB) | | Note |
|---|---|---|---|---|---|---|---|
| | | | | | 60° C., 90% RH | 1.0 mW Continuous readout | |
| 29 | A | — | — | 54 | 45 | 42 | Comparative example |
| 30 | " | XI-2 | — | 52 | 45 | 48 | Comparative example |
| 31 | " | — | Polystyrene | 50 | 46 | 42 | Comparative example |
| 32 | " | XI-4 | Chlorinated paraffin | 52 | 46 | 48 | Comparative example |
| 33 | II-1 | — | — | 53 | 50 | 50 | Present invention |
| 34 | " | XI-2 | — | 51 | 50 | 50 | Present invention |
| 35 | " | — | Nitrocellulose | 52 | 50 | 48 | Present invention |
| 36 | " | XI-4 | Polyethyl acrylate | 51 | 50 | 50 | Present invention |
| 37 | II-2 | — | — | 54 | 53 | 51 | Present invention |
| 38 | " | XI-2 | — | 53 | 51 | 52 | Present invention |
| 39 | " | — | Polyvinyl butyral | 53 | 52 | 51 | Present invention |
| 40 | " | XI-4 | Chlorinated paraffin | 52 | 51 | 52 | Present invention |
| 41 | II-3 | — | — | 54 | 53 | 51 | Present |

TABLE 3-continued

| Test No. | Dye | Quencher | Binder | C/N (dB) | After the forced deterioration test C/N (dB) 60° C., 90% RH | 1.0 mW Continuous readout | Note |
|---|---|---|---|---|---|---|---|
| 42 | " | XI-2 | — | 53 | 50 | 51 | Present invention |
| 43 | " | — | Polystyrene | 52 | 50 | 48 | Present invention |
| 44 | " | XI-4 | Polyvinyl formal | 51 | 50 | 50 | Present invention |
| 45 | II-4 | — | — | 54 | 52 | 50 | Present invention |
| 46 | " | XI-2 | — | 51 | 50 | 51 | Present invention |
| 47 | " | — | Polyvinyl alcohol | 52 | 51 | 49 | Present invention |
| 48 | " | XI-4 | Nitrocellulose | 51 | 50 | 50 | Present invention |
| 49 | II-5 | — | — | 54 | 53 | 51 | Present invention |
| 50 | " | XI-2 | — | 51 | 48 | 50 | Present invention |
| 51 | " | — | Polybutyl acrylate | 53 | 51 | 48 | Present invention |
| 52 | " | XI-4 | Polymethyl methacrylate | 51 | 50 | 50 | Present invention |
| 53 | II-6 | — | — | 55 | 53 | 51 | Present invention |
| 54 | " | XI-2 | — | 52 | 50 | 51 | Present invention |
| 55 | " | — | Nitrocellulose | 52 | 51 | 48 | Present invention |
| 56 | " | XI-4 | Chlorinated paraffin | 51 | 50 | 50 | Present invention |

EXAMPLE 3

A dye, a quencher and a binder in case of use each listed in Table 4 were dissolved in 2,2,3,3-tetrafluoropropanol. A polycarbonate support with a groove (pitch 1.6 μ, dpeth 750 Å) was coated with the solution using a spinner with a revolution number of about 1000 rpm, and dried. The weight ratio of the dye and quencher was 5:1, and in case of using a binder, the weight thereof was 1/5 of the dye.

The following evaluation conditions were applied.

Recording and readout
Laser : Semiconductor laser (GaAlAs)
Wavelength of laser : 780 nm
Beam size of laser : 1.6 μm
Line speed : 5 m/s
Recording power : 8 mW
Recording frequency : 2.5 MHz
Recording duty : 50%
Readout power : 0.4 mW Evaluation of readout deterioration
Readout power : 0.8 mW
Readout number : 10⁵ times Evaluation of deterioration during preservation
Prreservation temperature and humidity : 60° C., 90% RH
Preservation time : 30 days The results are shown in Table 4.

TABLE 4

| Test No. | Dye | Quencher | Binder | C/N (dB) Immediately after preparation | C/N (dB) After preservation (60° C., 90%, 30 days) | C/N (dB) After readout (0.8 mW, $10^5$ times) | Note |
|---|---|---|---|---|---|---|---|
| 57 | A | — | — | 54 | 45 | 42 | Comparative example |
| 58 | " | XI-2 | — | 52 | 45 | 48 | Comparative example |
| 59 | " | — | Polystyrene | 50 | 46 | 42 | Comparative example |
| 60 | " | XI-4 | Chlorinated paraffin | 52 | 46 | 48 | Comparative example |
| 61 | III-5 | — | — | 48 | 47 | 47 | Present invention |
| 62 | " | XI-2 | — | 45 | 44 | 44 | Present invnetion |
| 63 | " | — | Polyvinyl butyral | 44 | 43 | 43 | Present invention |
| 64 | " | XI-4 | Chlorinated paraffin | 45 | 44 | 44 | Present invention |
| 65 | III-13 | — | — | 48 | 47 | 47 | Present invention |
| 66 | " | XI-2 | — | 45 | 44 | 44 | Present invention |
| 67 | " | — | Nitrocellulose | 44 | 43 | 44 | Present invention |
| 68 | " | XI-4 | Polyvinyl alcohol | 45 | 44 | 44 | Present invention |
| 69 | IV-3 | — | — | 48 | 47 | 47 | Present invention |
| 70 | — | XI-2 | — | 45 | 44 | 43 | Present invnetion |
| 71 | " | — | Polyethyl acrylate | 44 | 43 | 43 | Present invention |
| 72 | " | XI-4 | Polyvinyl formal | 44 | 43 | 43 | Present invention |
| 73 | IV-7 | — | — | 53 | 50 | 50 | Present invention |
| 74 | " | XI-2 | — | 51 | 50 | 50 | Present invention |
| 75 | " | — | Nitrocellulose | 50 | 49 | 47 | Present invention |
| 76 | " | XI-4 | Polyethyl acrylate | 51 | 50 | 50 | Present invention |
| 77 | IV-10 | — | — | 54 | 52 | 52 | Present invention |
| 78 | " | XI-2 | — | 52 | 51 | 51 | Present invention |
| 79 | " | — | Polymethyl methacrylate | 52 | 51 | 50 | Present invention |
| 80 | " | XI-4 | Nitrocellulose | 52 | 51 | 51 | Present invention |

EXAMPLE 4

A dye, a quencher and a binder in case of necessity each listed in Table 5 were dissolved in a mixed solvent of ethanol, methyl ethyl ketone and dichloroethane with a proper mutual ratio. A surface-hardened acryl plate with a groove (pitch 1.6 μ, depth 750 Å) was coated with the solution whose dye concentration was 1% using a spinner with 1000 rpm, and dried. The weight ratio of the dye and quencher was 5:1, and in case of using a binder, the weight thereof was 1/5 of the dye.

The following evaluation conditions were employed.

| Recording and readout | |
|---|---|
| Laser : | (He—Ne laser (Wavelength 632.8 nm) |
| Beam size of laser : | 1.6 μm |
| Line speed | 5 m/s |
| Recording power | 8 mW |
| Recording frequency : | 2.5 MHz |
| Recording duty : | 50% |
| Readout power : | 0.4 mW |
| Evaluation of readout deterioration | |
| Readout power : | 0.8 mW |
| Readout number : | $10^5$ times |
| Evaluation of deterioration during preservation | |
| Preservation temperature and humidity : | 80° C., 90% RH |
| Preservation time : | 7 days |

The results are shown in Table 3.

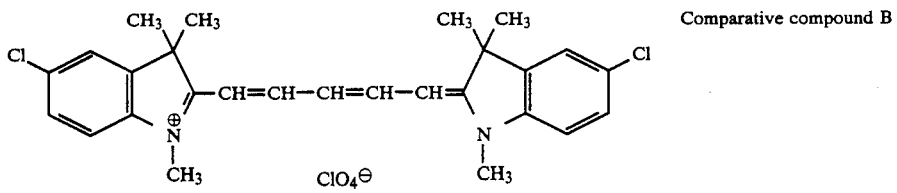

Comparative compound B

TABLE 5

| Test No. | Dye | Quencher | Binder | C/N (dB) Immediately after preparation | C/N (dB) After preservation (80° C., 90%, 7 days) | C/N (dB) After readout (0.8 mW, $10^5$ times) | Note |
|---|---|---|---|---|---|---|---|
| 81 | B | — | — | 51 | 32 | 40 | Comparative example |
| 82 | " | XI-2 | — | 50 | 31 | 47 | Comparative example |
| 83 | " | — | Polystyrene | 50 | 39 | 40 | Comparative example |
| 84 | " | XI-4 | Chlorinated paraffin | 49 | 39 | 47 | Comparative example |
| 85 | III-2 | — | — | 52 | 50 | 41 | Present invention |
| 86 | " | XI-2 | — | 51 | 50 | 50 | Present invention |
| 87 | " | — | Nitrocellulose | 51 | 50 | 41 | Present invention |
| 88 | " | XI-4 | Polybutyl acrylate | 51 | 50 | 50 | Present invention |
| 89 | III-3 | — | — | 52 | 50 | 42 | Present invention |
| 90 | " | XI-2 | — | 51 | 50 | 50 | Present invention |
| 91 | " | — | Chlorinated paraffin | 50 | 49 | 42 | Present invention |
| 92 | " | XI-4 | Polymethyl methacrylate | 50 | 49 | 48 | Present invention |
| 93 | IV-1 | — | — | 51 | 49 | 42 | Present invention |
| 94 | " | XI-2 | — | 50 | 48 | 49 | Present invention |
| 95 | " | — | Polybutyl methacrylate | 50 | 49 | 42 | Present invention |
| 96 | " | XI-4 | Nitrocellulose | 50 | 49 | 49 | Present invention |
| 97 | IV-2 | — | — | 52 | 51 | 42 | Present invention |
| 98 | " | XI-2 | — | 51 | 50 | 50 | Present invention |
| 99 | " | — | Polyvinyl butyral | 51 | 50 | 42 | Present invention |
| 100 | " | XI-4 | Polystyrene | 51 | 50 | 50 | Present invention |
| 101 | IV-16 | — | — | 51 | 50 | 42 | Present invention |
| 102 | " | XI-2 | — | 50 | 49 | 49 | Present invention |
| 103 | " | — | Polyvinyl alcohol | 50 | 49 | 43 | Present invention |
| 104 | " | XI-4 | Polyethyl acrylate | 49 | 48 | 48 | Present invention |

It is apparent from the results shown in Tables 2 to 5 that optical information recording media of the invention each have a high C/N and thus adequate recording characteristics, and have a high stability against long-term preservation or against long-time reading.

What is claimed is:

1. An optical information recording medium for carrying out recording and readout with laser beams, which comprises a support, and a recording layer on the support containing at least one compound selected from the group consisting of general formulae (1), (II), (III) and (IV);

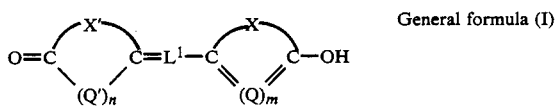

General formula (I)

wherein $L^1$ represents a methine group which may be substituted, or an atomic group whereby a polymethine chain is completed where 3, 5 or 7 methine groups are linked in turn to form conjugated double bonds and which chain may be substituted; Q and Q' are the same or different, and each represents an atomic group whereby a conjugated double bond chain is completed; m and n independently represent 0 or 1; and X and X' are the same or different, and each represents an atomic group necessary for forming a carbon ring, or an atomic group necessary for forming a heterocyclic ring selected from the following atomic groups (the carbon ring may form a condensed ring together with another ring, and the carbon ring or heterocyclic ring may have substituent(s)):

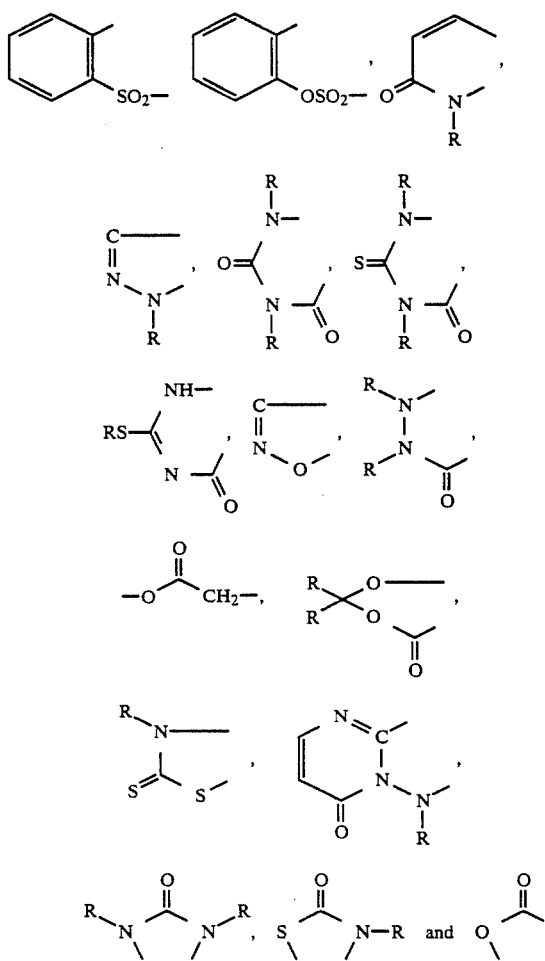

(wherein R represents a hydrogen atom or a substituent)

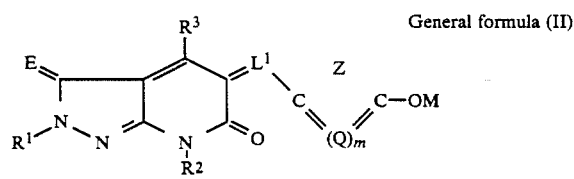

General formula (II)

wherein Q, L¹ and m are as defined in general formula (I); Z represents an atomic group necessary for forming a carbon ring or a heterocyclic ring (the carbon ring or heterocyclic ring may form a condensed ring together with another ring, or any have substituent(s)); M represents a hydrogen atom, a metal atom, a metal complex ion, an ammonium ion which may be substituted, or a quaternary phosphonium ion; E represents O, S or NR⁴; R¹ and R⁴ may be the same or different and each represents an optionally substituted alkyl group, an optionally substituted alkenyl group, an optionally substituted alkynyl group, an optionally substituted aryl group, an optionally substituted heterocyclic group, an optionally substituted amino group, an optionally substituted hydrazino group or an optionally substituted diazenyl group; R² represents an optionally substituted alkyl group, an optionally substituted aryl group, an optionally substituted alkenyl group, an optionally substituted alkynyl group or an optionally substituted heterocyclic group; R³ represents a hydrogen atom, a halogen atom, a cyano group, a nitro group, a hydroxyl group, a carboxyl group, an optionally substituted alkyl group, an optionally substituted aryl group, an optionally substituted alkenyl group, an optionally substituted alkoxy group, an optionally substituted aryloxy group, an optionally substituted heterocyclic group, an optionally substituted alkoxycarbonyl group, an optionally substituted aryloxycarbonyl group, an optionally substituted amino group, an optionally substituted acyloxy group, an optionally substituted carbamoyl group, an optionally substituted sulfamoyl group, an optionally substituted alkylthio group, an optionally substituted arylthio group, an optionally substituted alkylsulfonyl group, an optionally substituted arylsulfonyl group or an optionally substituted alkynyl group; and R¹ and R⁴ may also combine to form a ring;

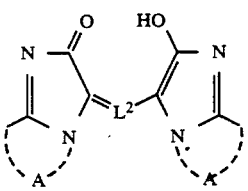

General formula (III)

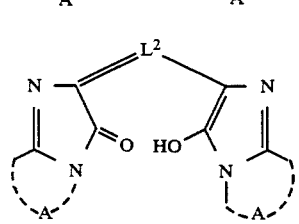

General formula (IV)

in the above general formulae (III) and (IV), A represents an atomic group necessary for forming a pyridine, pyrimidine, pyrazine or triazine ring (these rings may each form a condensed ring together with a benzene ring, and these rings may each be substituted with substituent(s) each having 30 or less carbon atoms); and L² represents an optionally substituted methine group, or a group formed by linking optionally substituted 3 or 5 methine groups in turn to form conjugated double bonds.

2. The optical information recording medium of claim 1, wherein in the formula, (I), the atomic group forming a carbon ring represented by X or X' is selected from the group consisting of:

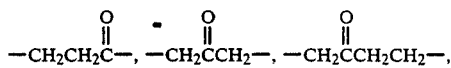

-continued

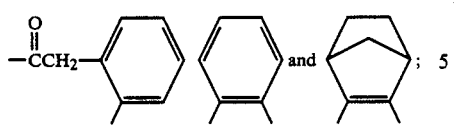

the "substituent" in the definition of R or R' represents an optionally substituted alkyl group, an optionally substituted aralkyl group or an optionally substituted aryl group; and $L^1$ is selected from the group consisting of general formulae (a) to (h):

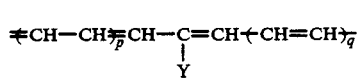 General formula (a)

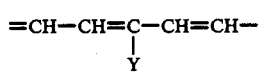 General formula (b)

General formula (c)

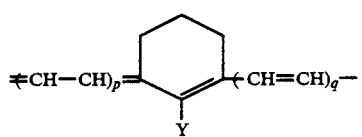

General formula (d)

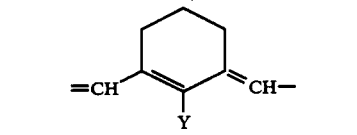

General formula (e)

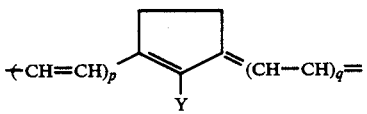

General formula (f)

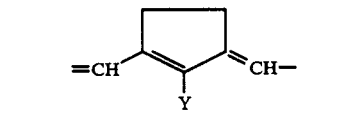

General formula (g)

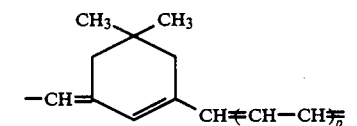

General formula (h)

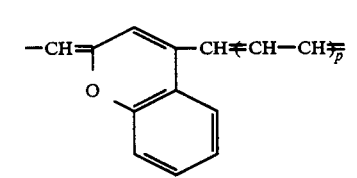

in general formulae (a) to (h), Y represents a hydrogen atom or a monovalent group, and p and q independently represent 0 or 1.

3. The optical information recording medium of claim 2, wherein in general formula (II), a ring containing Z and Q is a 4-, 5-, 6- or 7-membered ring, these rings may each form a condensed ring together with another 4-, 5-, 6- or 7-membered ring, these rings may have substituent(s), and heteroatoms used for forming a heterocyclic ring containing Z and Q are selected from the group consisting of B, N, O, S, Se, Te and combinations thereof.

4. The optical information recording medium of claim 3, wherein in general formula (II), the atomic group forming a carbon ring represented by Z is selected from the group consisting of

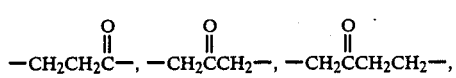

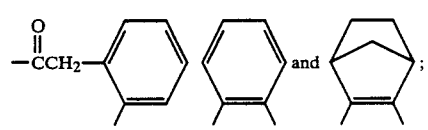

and the atomic group forming a heterocyclic ring represented by Z is selected from the group consisting of

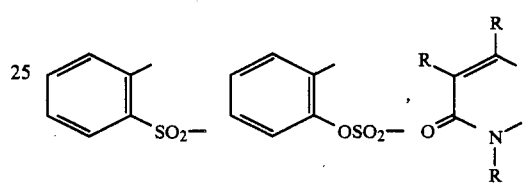

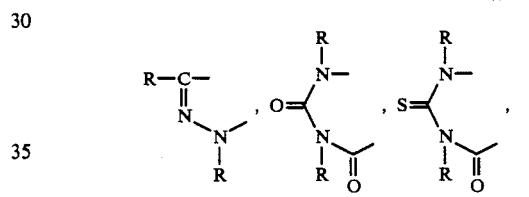

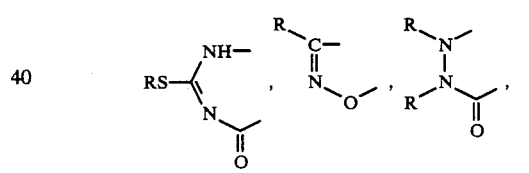

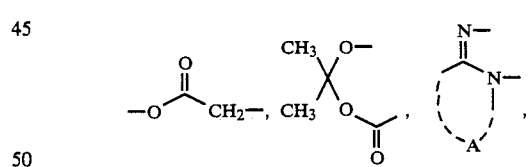

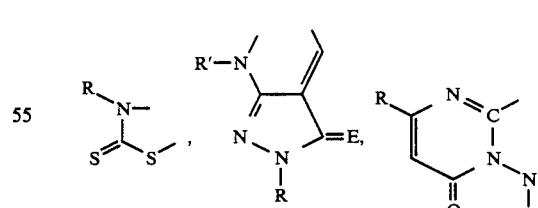

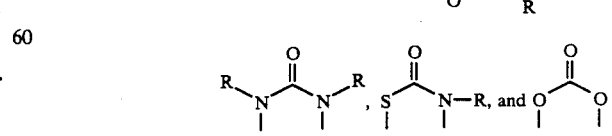

wherein R represents a hydrogen atom, a substituted or unsubstituted alkyl group, a substituted or unsubstituted, aralkyl group or a substituted or unsubstituted aryl group, R' has the same meaning as R provided that R' does not represent a hydrogen atom, A has the same meaning as defined in general formula (III) and (IV) and E has the same meaning as defined in general formula (II).

5. The optical information recording medium of claim 1, wherein in the general formula (III) or (IV), the substituent(s) each having 30 or less carbon atoms represent(s) a member selected from the group consisting of alkyl, aralkyl, aryl, hydroxyl, F, Cl, Br, I, cyano, nitro, alkoxy, aralkyloxy, aryloxy, acyl, acyloxy, acylamino, sulfonamino, aryloxycarbonyl, aralkyloxycarbonyl, alkoxycarbonyl, carbamoyl, sulfamoyl, carboxyl or carboxylato, sulfonic acid or sulfonato, acrbamoylamino, sulfamoyl amino, alkylsulfonyl, aralkylsulfonyl, araylsulfonyl, alkylsulfinyl, aralkylsulfinyl, alkylthio, aralkylthio or arylthio group(s) (these groups may each further have substituent(s); and $L^2$ represents a group selected from the groups of the general formulae (a') to (g'):

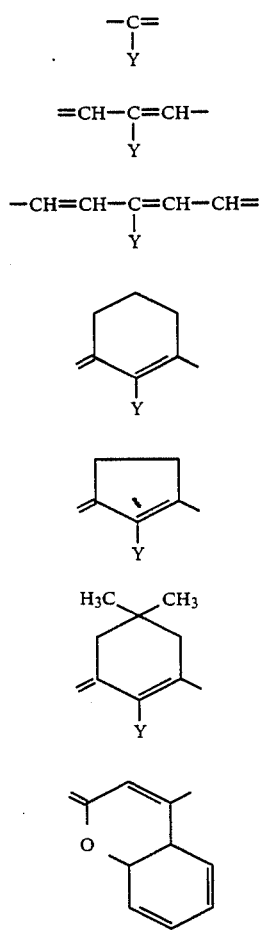

General formula (a')

$$-\underset{Y}{C}=$$

General formula (b')

$$=CH-\underset{Y}{C}=CH-$$

General formula (c')

$$-CH=CH-\underset{Y}{C}=CH-CH=$$

General formula (d')

General formula (e')

General formula (f')

General formula (g')

in the general formulae (a') to (g'), and Y represents a hydrogen atom or a monovalent group.

6. The optical information recording medium of claim 1, further comprising a singlet oxygen quencher.

7. The optical information recording medium of claim 6, wherein the singlet oxygen quencher is a compound represented by general formula (XI) or (XII): wherein [Cat₁] and [Cat₂] each represents a cation necessary for making each complex neutral, $M_1$ and $M_2$ each represents nickel, copper, cobalt, palladium or platinum, and r represents 1 or 2.

8. The general information recording medium of claim 6, wherein the quencher is used in an amount of 0.05 to 12 moles per 1 mole of at least one of the dyes of the general formulae (I) to (Iv).

9. The optical information recording medium of claim 1, further comprising a subbing layer on the support, a protective layer on said recording layer, and a reflecting layer on the support or recording layer.

10. The optical information medium of claim 6, wherein the quencher is contained in said recording layer.

11. The optical information recording medium of claim 2, wherein Y is a monovalent group selected from the group consisting of an optionally substituted lower alkyl group, an optionally substituted aralkyl group, an optionally substituted aryl group, a lower alkoxy group, a cycloalkyloxy group, a disubstituted amino group, an alkylcarbonyloxy group, an alkylthio group, an arylthio group, a cyano group, a nitro group and a halogen atom.

12. The optical information recording medium of claim 2, wherein $L^1$ is represented by general formulae (a) or (b), Y is a hydrogen atom and at least one of p and q is O.

13. The optical information recording medium of claim 1, wherein in formula (II), M is selected from the group consisting of a hydrogen atom, an alkali metal ion, an alkaline earth metal ion, a nickel ion, a copper ion, an iron ion, a cobalt ion, a chromium ion, a cation complex containing Ni, Cu, Fe, Co or Cr, an ammonium ion optionally substituted with alkyl, aryl or aralkyl group(s) each having 30 or less carbon atoms, and a quaternary phosphonium ion substituted with alkyl, aryl or aralkyl group(s) each having 40 or less carbon atoms.

14. The optical information recording medium of claim 1, wherein in formula (II), $R^1$ or $R^4$ are selected from the group consisting of an optionally substituted alkyl group having 1 to 30 carbon atoms, an optionally substituted phenyl group having 6 to 30 carbon atoms, and an optionally substituted 5- or 6-membered heterocyclic group having 1 to 30 carbon atoms.

15. The optical information recording medium of claim 1, wherein in formula (11), $R^2$ is selected from the group consisting of an optionally substituted alkyl group having 1 to 30 carbon atoms, an optionally substituted phenyl group having 6 to 30 carbon atoms, and an optionally substituted heterocyclic group having 1 to 30 carbon atoms.

16. The optical information recording medium of claim 1, wherein in formula (II), $R^3$ is selected from the group consisting of a hydrogen atom, an optionally substituted alkyl group having 1 to 30 carbon atoms, an optionally substituted phenyl group having 6 to 30 carbon atoms, an optionally substituted carbamoyl group having 1 to 30 carbon atoms, an optionally substituted alkoxycarbonyl group having 2 to 30 carbon atoms, an optionally substituted phenoxycarbonyl group having 7 to 30 carbon atoms, a carbonyl group, and a hydroxyl group.

17. The optical information recording medium of claim 7, wherein [Cat₁] and [Cat₂] are alkali metal ions or alkaline earth metal ions.

18. The optical information recording medium of claim 7, wherein [Cat₁] and [Cat₂] are quaternary ammonium ions or quaternary phosphonium ions.

19. The optical information recording medium of claim 7, wherein [CatI] and [Cat$_2$] are selected from the group consisting of formulae (XIII-a), (XIII-b), (XIII-c), (XIII-d) and (XIII-e) wherein $R^{11}$, $R^{12}$, $R^{13}$, $R^{14}$, $R^{15}$, $R^{16}$, $R^{17}$, $R^{18}$, $R^{19}$, $R^{20}$, $R^{21}$, and $R^{22}$ each represents a substituted or unsubstituted alkyl group having 1 to 20 carbon atoms, or a substituted or unsubstituted aryl group having 6 to 14 carbon atoms, and $Z^1$ and $Z^2$ each represent a nonmetal atomic group which forms a 5-membered or 6-membered ring together with a nitrogen atom or a phosphorous atom in each formula.

20. The optical information recording medium of claim 19 wherein [Cat$_1$] and [Cat$_2$] are selected from the group consisting of formulas (XIII-a), (XIII-b), (XIII-d) and (XIII-e).

* * * * *